United States Patent
Stringham

(10) Patent No.: US 11,140,213 B2
(45) Date of Patent: Oct. 5, 2021

(54) SYSTEMS AND METHODS FOR DISTRIBUTING ELECTRONIC DOCUMENTS

(71) Applicant: Gary G. Stringham, Boise, ID (US)

(72) Inventor: Gary G. Stringham, Boise, ID (US)

(*) Notice: Subject to any disclaimer, the term of this patent is extended or adjusted under 35 U.S.C. 154(b) by 0 days.

(21) Appl. No.: 16/560,633

(22) Filed: Sep. 4, 2019

(65) Prior Publication Data

US 2020/0076877 A1 Mar. 5, 2020

Related U.S. Application Data

(60) Provisional application No. 62/727,356, filed on Sep. 5, 2018.

(51) Int. Cl.
| | |
|---|---|
| *H04L 29/08* | (2006.01) |
| *G06F 16/901* | (2019.01) |
| *H04L 29/06* | (2006.01) |
| *G06F 16/93* | (2019.01) |

(52) U.S. Cl.
CPC ............ *H04L 67/06* (2013.01); *G06F 16/901* (2019.01); *G06F 16/93* (2019.01); *H04L 63/126* (2013.01)

(58) Field of Classification Search
CPC ....... H04L 67/06; H04L 63/126; G06F 16/93; G06F 16/901
See application file for complete search history.

(56) References Cited

U.S. PATENT DOCUMENTS

| | | | | |
|---|---|---|---|---|
| 7,693,866 | B1* | 4/2010 | Weaver | G06F 16/93 707/999.107 |
| 8,245,141 | B1* | 8/2012 | Fuller | H04L 12/1822 715/741 |
| 8,943,071 | B2* | 1/2015 | Bishop | G06F 16/958 707/748 |
| 9,853,759 | B1* | 12/2017 | Rae | G06Q 20/12 |
| 10,268,996 | B1* | 4/2019 | Wannamaker | G06Q 30/00 |
| 10,748,139 | B2* | 8/2020 | Klenoff | G06F 16/23 |
| 10,991,054 | B2* | 4/2021 | Yang | G06F 16/334 |

(Continued)

OTHER PUBLICATIONS

"Earth Class Mail: From your mailbox to your inbox," Earth Class Mail, 2020, retrieved from https://www.earthclassmail.com/, 8 pages.

(Continued)

*Primary Examiner* — Blake J Rubin
(74) *Attorney, Agent, or Firm* — Sheridan Ross P.C.

(57) ABSTRACT

Systems and methods of the present disclosure are directed to providing an electronic document storage (EDS) system enabling companies or customers to upload electronic documents to be distributed online. These electronic documents may be made available to one or more specified customers, recipients of the documents, by authenticating login credentials provided by the customers. Metadata used to identify the recipients may be extracted from the electronic files or comprise separate electronic files. The EDS system may ensure that companies cannot access documents uploaded by other companies or customers for other companies, and that customers access only documents that the customers are authorized to access. To provide additional security, the EDS system may accept encrypted electronic documents and decrypt the electronic documents to allow customer access.

21 Claims, 14 Drawing Sheets

(56) References Cited

U.S. PATENT DOCUMENTS

| | | | |
|---|---|---|---|
| 2008/0320397 A1* | 12/2008 | Do | G06Q 10/10 715/751 |
| 2009/0150169 A1* | 6/2009 | Kirkwood | G06Q 10/08 705/342 |
| 2011/0196771 A1* | 8/2011 | Lacerte | G06Q 20/14 705/35 |
| 2012/0030289 A1* | 2/2012 | Buford | G06Q 10/10 709/205 |
| 2012/0116963 A1* | 5/2012 | Klein | G06Q 20/102 705/40 |
| 2012/0180116 A1* | 7/2012 | Sagi | H04L 63/08 726/7 |
| 2012/0191585 A1* | 7/2012 | Lefebvre | G06Q 40/00 705/35 |
| 2013/0246474 A1* | 9/2013 | Victor | G06F 16/93 707/785 |
| 2013/0254699 A1* | 9/2013 | Bashir | G06Q 10/10 715/772 |
| 2013/0254897 A1* | 9/2013 | Reedy | G06F 21/6218 726/26 |
| 2013/0290710 A1* | 10/2013 | Broder | H04L 63/102 713/168 |
| 2014/0195416 A1* | 7/2014 | Linscott | G06Q 20/102 705/39 |
| 2014/0214759 A1* | 7/2014 | Williams | G06Q 40/00 707/608 |
| 2015/0012422 A1* | 1/2015 | Ceribelli | G06Q 20/0425 705/40 |
| 2015/0012489 A1* | 1/2015 | Ceribelli | G06Q 30/04 707/611 |
| 2015/0100503 A1* | 4/2015 | Lobo | G06Q 10/103 705/301 |
| 2015/0310005 A1* | 10/2015 | Ryger | G06F 16/3334 707/706 |
| 2016/0065561 A1* | 3/2016 | DeCrescenzo | H04L 63/083 726/4 |
| 2016/0071074 A1* | 3/2016 | Baird | G06Q 20/367 705/40 |
| 2017/0351913 A1* | 12/2017 | Chen | G06K 9/00442 |
| 2018/0144314 A1* | 5/2018 | Miller | G06Q 20/14 |
| 2018/0158116 A1* | 6/2018 | Hoang | G06Q 20/00 |
| 2018/0322547 A1* | 11/2018 | Lacerte | G06Q 40/00 |
| 2019/0095968 A1* | 3/2019 | Ceribelli | G06Q 30/0609 |

OTHER PUBLICATIONS

"FileThis: Simple. Seamless. Secure.," FileThis, 2018, retrieved from https://filethis.com/, 3 pages.

"Lanvera: Transforming Customer Documents and Communications," Lanvera, 2020, retrieved from https://www.lanvera.com/.

"MyCheckFree: Your Personal Online Pap tent Center," MyCheckFree, dated 2001, retrieved from https://mycheckfree.com/, 1 page.

* cited by examiner

| Field Name | Field Value |
|---|---|
| Customer Name | |
| Customer Address | |
| Phone number | |
| Email | |
| Company Name | |
| Customer ID | |
| Account Number | |
| Filename | |
| Document Name | |
| Document Date | |
| Document ID | |
| File Format | |
| Number of Pages | |
| Retention Time | |

*Fig. 5*

SYSTEMS AND METHODS FOR DISTRIBUTING ELECTRONIC DOCUMENTS

CROSS REFERENCE TO RELATED APPLICATIONS

This application claims the benefit of U.S. Provisional Patent Application No. 62/727,356, entitled "SYSTEM AND METHODS FOR DISTRIBUTING ELECTRONIC DOCUMENTS," filed on Sep. 5, 2018, which application is incorporated herein by reference, in its entirety, for all that it teaches and for all purposes.

TECHNICAL FIELD

The present disclosure is generally directed to online access to electronic documents. More specifically, the present disclosure is directed to systems and methods to allow customers who receive documents from companies to more easily access those documents online.

BACKGROUND

Companies desire to use paperless bills, statements, and other documents that can be accessed online to reduce printing, paper, and mailing costs. Companies may make those documents available online in an electronic format. A customer may create an account on the company's website or electronic portal to access the customer's electronic documents. Such paperless systems often create obstacles that reduce customer adoption and satisfaction, including (1) customers often must create and manage multiple online accounts and account passwords; (2) customers often must log into each and every one of the various companies' websites every month and navigate through the companies' various websites of varying quality to obtain monthly electronic documents; (3) companies may not keep electronic documents available online long enough to satisfy customers' document retention requirements for taxes, insurance, regulations, and other purposes; and (4) companies may upload documents to cloud service providers and then share these documents with customers, but not all customers have cloud accounts. If a customer creates a cloud account later, the customer may not be able to access documents uploaded by companies prior to the creation date of the cloud account.

SUMMARY

Described herein is an electronic document storage (EDS) system with the capability to receive documents from one or more companies on a periodic or aperiodic basis, and make each document accessible to one or more document recipients, typically customers of the one or more companies. The EDS system aggregates each customer's documents from all companies with which a customer does business. The customer accesses the aggregated documents via one online EDS account. The EDS system may retain and keep documents available online longer than the companies would keep such documents available online.

Because embodiments of the present disclosure may have information concerning several accounts belonging to a particular customer and will be able to determine whether documents are currently provided to customers via paper or paperless delivery, such systems and methods can encourage customers to switch more paper documents to paperless documents, a green effort. For example, a system may display to a customer, "Congratulations. You are 71% paperless. Click here to switch more document deliveries to paperless." As customers migrate to paperless delivery, companies save money by avoiding the expense of printing and mailing paper documents, while also reducing the impact on the environment. Currently, some companies struggle to achieve more than a 50% paperless document goal, and the present disclosure may allow companies to achieve significantly higher paperless percentages.

The present disclosure can provide a number of advantages depending on the particular configuration. These and other advantages will be apparent from the disclosure contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 5 is a database table in accordance with at least one embodiment of the present disclosure;

DETAILED DESCRIPTION

Figure 1:
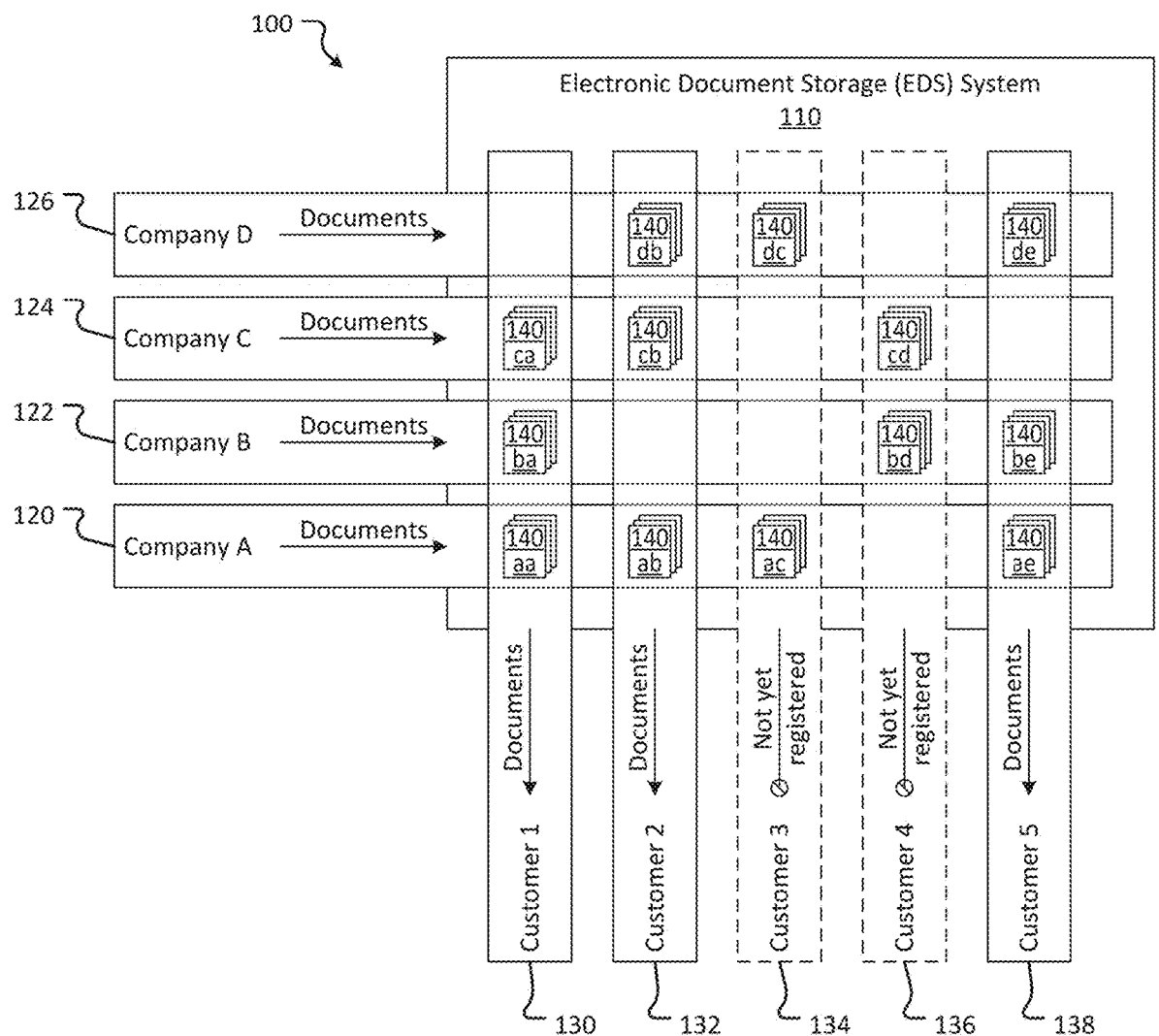
FIG. 1 is a document flow diagram in accordance with at least one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Embodiments of the present disclosure are generally directed to distribution of electronic documents, in particular, toward systems and methods to collect, aggregate, and/or combine electronic documents from one or more companies and make these documents available online to customers of these companies.

A company is a business that provides goods and services to customers. As part of a company's services, a company may send paper and/or electronic documents to customers. Companies may include utilities, financial institutions, telecommunication providers, medical providers, insurance companies, and many others. Companies may also send paper and/or electronic documents to their employees, such as paystubs and tax documents.

A customer is an individual, household, or other entity that may receive goods and services from one or more companies, such as electricity from a power company or a checking account at a bank. In conjunction with those goods and services, customers may regularly receive documents from those companies, such as a monthly power bill or bank statement. A customer may also be a business that receives goods and services from other companies, and thus a business may receive documents, such as electric bills, bank statements, and invoices. For purposes of the present disclosure, a customer may also be an employee that periodically receives paystubs from the company at which the employee works.

Documents include utility bills, cable and satellite television bills, phone bills, bank statements, medical bills, paystubs, investment account statements, credit card bills, loan statements, tax documents, insurance documents, and/or any other documents that a company may produce and send to customers. A company may produce such documents as a service or as required by laws and/or regulations. Electronic documents are typically in a Portable Document Format (PDF) format but may be in other electronic file formats, such as word processing, spreadsheet, presentation, text, image, drawing, audio, video, compressed, encrypted, programming, software, executable, media, and/or any other file format. A customer may log into the electronic document storage (EDS) system to access a desired document, view the document, and, if desired, download, print, and/or forward the document.

Documents may be sent by companies to customers periodically or nonperiodically. Many documents, such as utility bills and bank statements, may be sent monthly. Some, like paystubs, may be sent weekly, twice a month, monthly, or some other time period. Auto insurance premium documents may be sent twice a year. Tax statements may be sent once a year. Medical bills may be sent nonperiodically as needed.

FIG. 1 is a document flow diagram 100. The document flow diagram 100 includes an electronic document storage (EDS) system 110, Company A (120), Company B (122), Company C (124), Company D (126), Customer 1 (130), Customer 2 (132), Customer 3 (134), Customer 4 (136), and Customer 5 (138). Document flow diagram 100 demonstrates the flow of electronic documents, including documents 140*aa*, 140*ab*, etc., from companies through the EDS system 110 to recipients of the documents, typically customers, e.g., Customer 1 (130). In this example, there are four companies and five customers. In other embodiments, there are one or more companies distributing documents to one or more customers. The number of companies and customers may vary over time.

Each company transfers electronic documents to the EDS system 110 for one or more customers. For example, Company A (120) transfers documents 140*aa* for Customer 1 (130), documents 140*ab* for Customer 2 (132), documents 140*ac* for Customer 3 (134), and documents 140*ae* for Customer 5 (138). Some customers are registered as users on the EDS system 110, including Customer 1 (130), Customer 2 (132), and Customer 5 (138). Other customers are not registered on the EDS system 110, including Customer 3 (134) and Customer 4 (136). Electronic documents 140*aa-de* flow from Companies A-D, are processed and stored on the EDS system 110, and are then accessible to Customers 1-5. Each of the electronic documents 140*aa-de* may consist of one or more electronic document files, and zero or more metadata files.

Companies A-D upload electronic documents 140*aa-de* to the EDS system 110. Alternatively, EDS system 110 may retrieve electronic documents 140*aa-de* from Companies A-D. In FIG. 1, the electronic documents 140*aa-de* are distributed across the Companies' A-D respective rows to Customers 1-5, thus representing that the documents 140*aa-de* are made available to the corresponding customer via the EDS system 110. Each month or when needed, Companies A-D upload another batch of documents 140*aa-de* to be distributed to the Customers 1-5. Not all Customers 1-5 are customers of all of the Companies A-D. As illustrated in FIG. 1, Customer 2 (132) and Customer 3 (134) are not customers of Company B (122).

Customers 1-5 may log into the EDS system 110 as users to access all electronic documents 140*aa-de* from the companies with whom the customers do business. As illustrated in FIG. 1, Customer 2 (132) is a customer of Company A (120), Company C (124), and Company D (126), but not Company B (122), and thus Customer 2 (132) would have access to electronic documents 140*ab*, 140*cb*, and 140db.

Companies upload documents for all Customers 1-5 to the EDS system 110 regardless of whether or not a customer has created a user account (so as to become a registered user) on the EDS system 110. As illustrated in FIG. 1, Customer 3 (134) and Customer 4 (136) have not yet created a user account on the EDS system 110. Therefore, the electronic documents 140*ac*, 140*dc*, 140*bd*, and 140*cd*, although stored in the EDS system 110 and correlated to Customers 3 and 4 as recipients of the documents, are not yet accessible by these customers. If Customer 3 (134) at some future time becomes a registered user of the EDS system 110 by creating a user account with the EDS system 110, all of the documents stored on EDS system 110 that match the name, address, and other details of Customer 3 will then be made available to Customer 3 (134) via the EDS system 110, including all of the past documents 140*ac* and 140*dc* that have previously been uploaded and stored on the EDS system 110 (provided they are still stored on the EDS system 110). In some embodiments, only documents for customers that have granted a company permission to share customer information or electronic documents with the EDS system 110 are transferred to the EDS system 110. In some embodiments, a customer may also revoke authorization for a company to upload the customer's electronic documents or metadata to the EDS system 110.

The EDS system 110 is configured to ensure that when a company accesses the EDS system 110 to upload a new batch of electronic documents, the company is not allowed to access any electronic documents uploaded by other companies, unless access is authorized by one or more of the other companies. The EDS system 110 is also configured to ensure that when a customer logs into the EDS system 110 as a registered user, the customer is only allowed to access electronic documents associated with the customer and not those of any other customer. The EDS system 110 user registration process, not shown, confirms the identity of a customer, and creates an association between the new user account and the user's customer data. The EDS system 110 login process authenticates the customer based on provided login credentials, as shown in FIGS. 2C, 3C, 4C, 7, and 8. In some embodiments, one customer (or person) may be authorized to access another customer's electronic documents, for example, when a guardian or conservator accesses documents for a dependent person or ward.

In some embodiments, customers may upload electronic documents to the EDS system 110 to consolidate electronic documents. For example, a customer may use the EDS system 110 to send a bundle of electronic documents to a payment service, a tax preparer, or another service. Alternatively, a customer may upload documents received directly from a company so as to ensure that the documents will remain available via the EDS system 110.

Figure 2A:
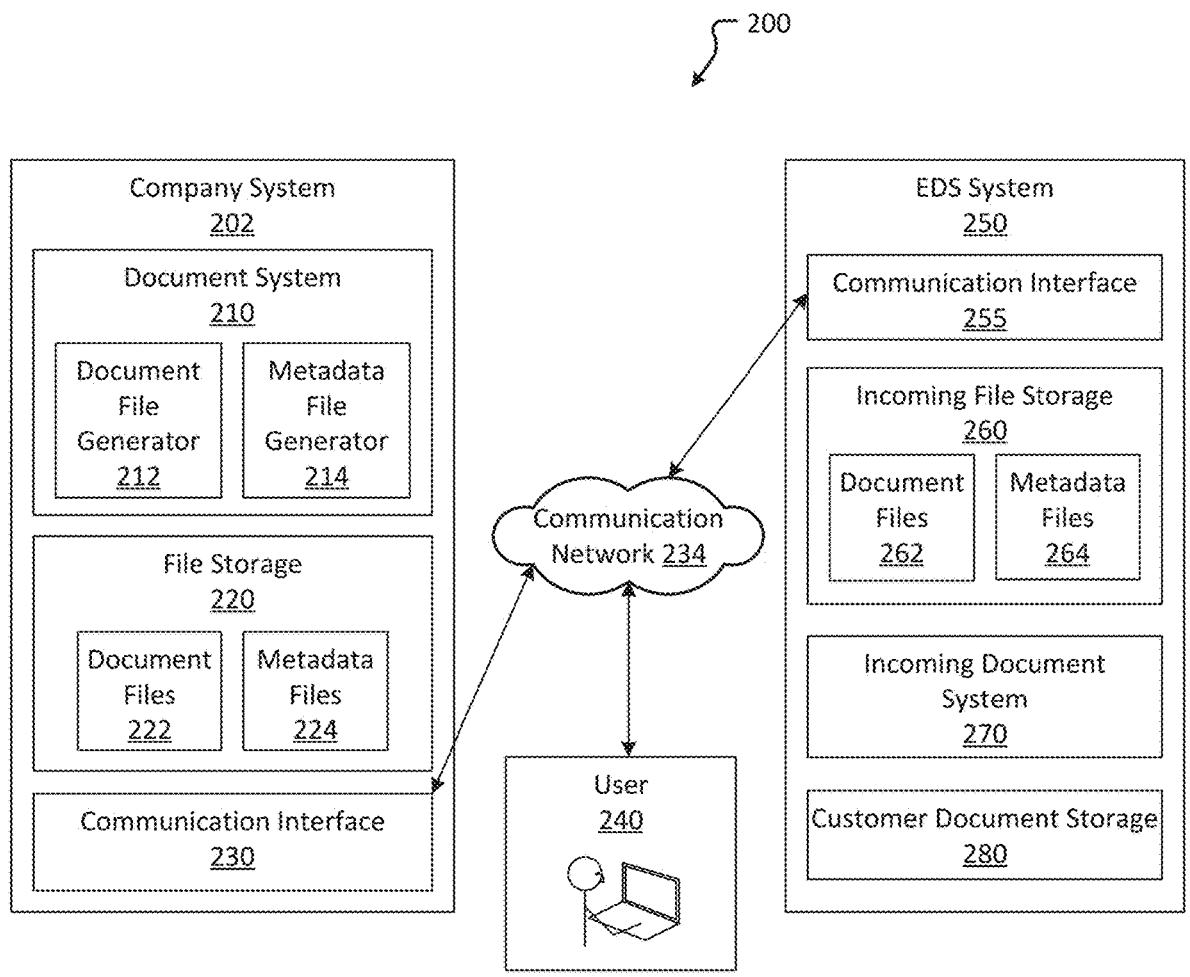
FIG. 2A is a block diagram of systems in accordance with at least one embodiment of the present disclosure.

FIG. 2A is a block diagram of a system 200 comprising a company system 202, an EDS system 250, and document files made accessible to a user 240. Document system 210 of the company system 202 utilizes a document file generator 212 to generate the document files 222. The document file generator 212 may comprise software and/or hardware configured to gather data corresponding to a customer of the company that owns and/or operates the company system 202, generate a document containing information that corresponds to the gathered data, and create a document file 222 containing one or more of such documents. Where the document file 222 comprises a plurality of electronic documents, the documents may correspond to one customer of the company or to a plurality of customers of the company.

Document files 222 generated by the document file generator 212 are stored in the file storage 220. The file storage 220 may be any kind of computer readable memory suitable for storing one or more files.

The document system 210 also comprises a metadata file generator 214, which generates metadata files 224. The metadata file generator 214 may comprise software and/or hardware configured to generate metadata files 224 containing information about each document in a document file 222, including, for example, information about the title of the document, the customer to whom the document relates, and the date of the document. In some embodiments, one metadata file 224 corresponds to one electronic document in a document file 222. In other embodiments, one metadata file 224 corresponds to a plurality of documents or to all documents in a document file 222. Metadata files 224 generated by the metadata file generator 214 are stored in the file storage 220 as well.

The communication interface 230 is used to transmit a bundle of document files 222 and metadata files 224 to the communication network 234. The communication interface may comprise software and/or hardware configured to enable communication between the company system 202 and the communication network 234. In some embodiments, the communication interface 230 also comprises software and/or hardware to enable communication among the various components of the company system 202. The communication interface 230 may be configured for wired communication and/or for wireless communication, and may be configured to utilize any wired or wireless communication protocol. The bundle of document files 222 and metadata files 224 may comprise any combination of document files 222 and metadata files 224, including only one document file 222, only one metadata file 224, one document file 222 and one metadata file 224, or any other combination.

The document files 222 and metadata files 224 may be transmitted via the communication network 234. The communication network 234 can be or may include any collection of communication hardware and software that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The communication network 234 can use a variety of electronic protocols, such as Ethernet, Internet Protocol (IP), Session Initiation Protocol (SIP), Integrated Services Digital Network (ISDN), Hyper Text Markup Language (HTML), Java Script, Web Real-Time Communication (WebRTC), and/or the like. The document files 222 and metadata files 224 may be transmitted over a communication network 234 using technologies such as Wi-Fi, Bluetooth®, ZigBee, GSM, LTE, Ethernet, or any other wired or wireless communication protocol. In other embodiments, document files 222 and metadata files 224 may be transmitted via email, through a third-party cloud storage provider, through facsimile machines, and/or through other file transmission methods. Alternatively, the files could be transported via a physical medium, such as a flash drive, Solid State Drive (SSD), disc drive, magnetic tape, and/or the like.

In some embodiments, a first company may provide goods and services to customers, and may contract with a separate third-party company that owns and/or operates all or part of the company system 202. In such embodiments, the first company may send to the separate third-party company data for use by the document file generator 212 and/or by the metadata file generator 214. The third-party company's may generate document files 222 and metadata files 224 and transfer the files to the EDS system 250 via the communication network 234. The third-party company may provide similar services for a plurality of companies.

Figure 13:
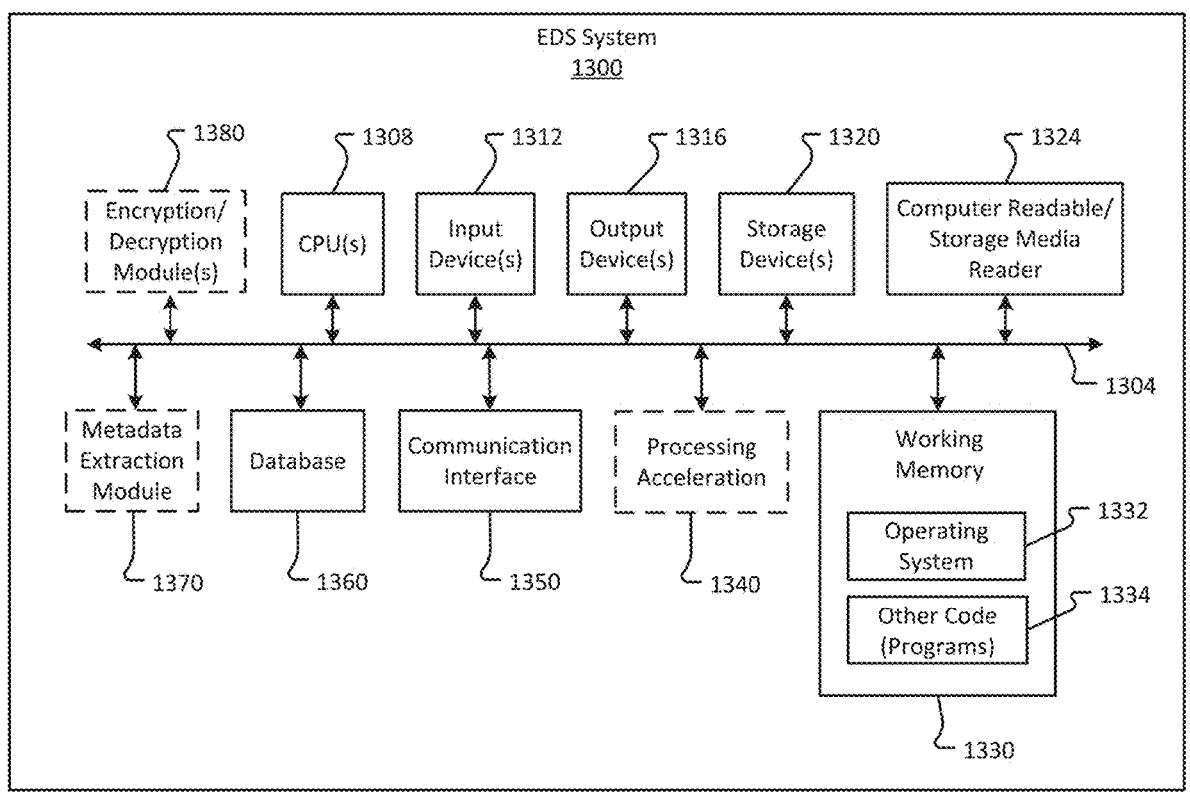
FIG. 13 is a block diagram of a system in accordance with at least one embodiment of the present disclosure.

The EDS system 250 may be implemented using third-party cloud servers, such as Amazon Web Services. Alternatively, the EDS system 250 may be implemented using local servers and computers, as shown in FIG. 13, and/or the like.

Document files 222 and metadata files 224 incoming to the EDS system 250 via the communication network 234 are received via the communication interface 255. The communication interface 255 may comprise software and/or hardware configured to enable communication between the EDS system 250 and the communication network 234. In some embodiments, the communication interface 255 also comprises software and/or hardware to enable communication among the various components of the EDS system 250. The communication interface 230 may be configured for wired communication and/or for wireless communication, and may be configured to utilize any wired or wireless communication protocol.

The incoming file storage 260 comprises computer-readable memory configured to store incoming document files 222 (which, as stored in the incoming file storage 260, comprise document files 262) and incoming metadata files 224 (which, as stored in the incoming file storage 260, comprise metadata files 264).

The incoming document system 270 retrieves these document and metadata files 262 and 264 from incoming file storage 260 and processes them. The incoming document system 270 may comprise software and/or hardware configured to read document files 262 and metadata files 264 from the incoming file storage 260, process the same to determine (based on metadata from the metadata files 264, in some embodiments) a recipient, or addressee, of each document file 262, and store each document file 262 (and, in some embodiments, each corresponding metadata file 264) in customer document storage 280 for each customer.

Customer data storage 280 is a long-term computer-readable memory configured to store electronic documents associated with each recipient for whom document files 222 are received by the EDS system 250.

Figure 2B:
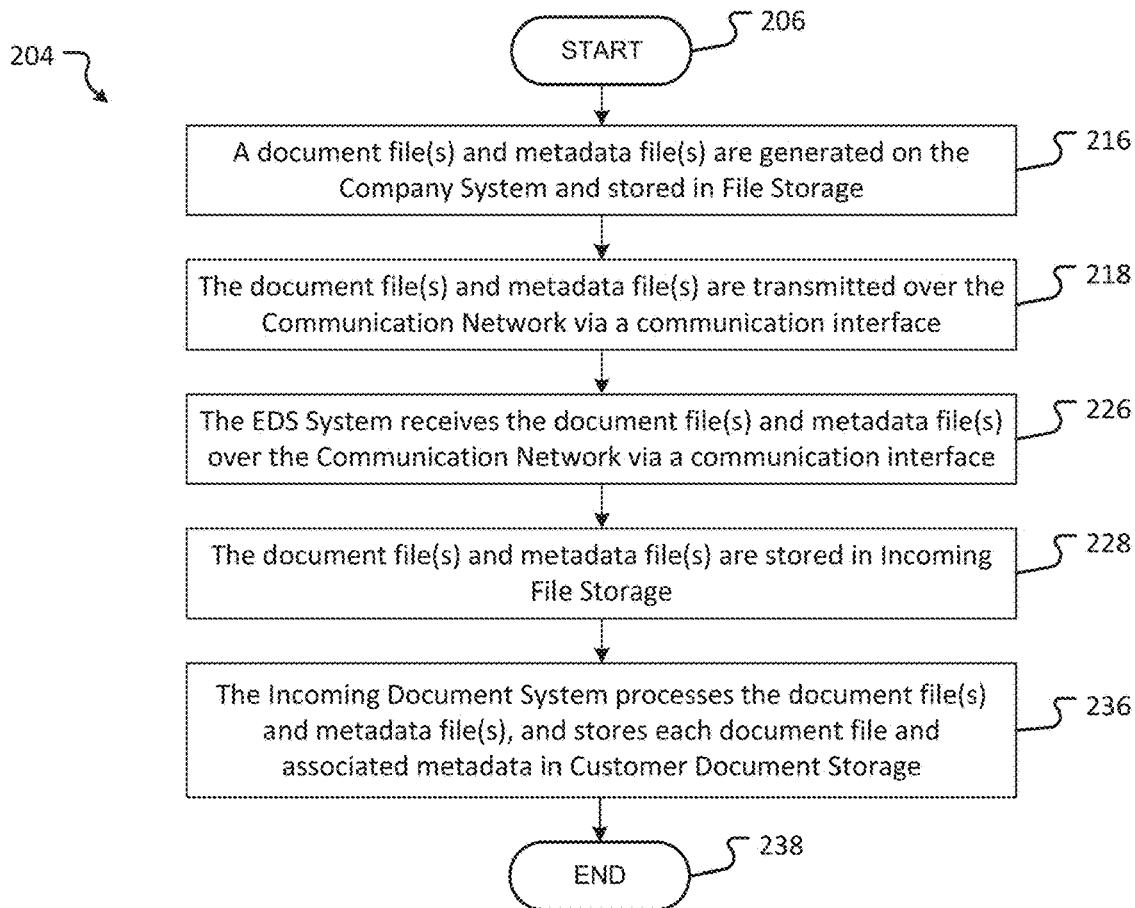
FIG. 2B is a flowchart of a process in accordance with at least one embodiment of the present disclosure.

FIG. 2B is a flowchart illustrating one process 204 that may be performed by a company system 202 and an EDS system 250 to exchange one or more document files and one or more metadata files, so that one or more document files may be made accessible to a user 240 via the EDS system 250.

The process 204 begins at step 206. At step 216, the document system 210 of the company system 202 utilizes the document file generator 212 to generate a document file 222, and stores the document file in the file storage 220. In parallel or in sequence, a metadata file generator 214 of the document system 210 generates a metadata file 224 containing metadata associated with the document file 222 or appends metadata associated with the document file 222 to an existing metadata file 224, and likewise stores the metadata file 224 in the file storage 220. This process may be repeated for one or more document files. At step 218, the bundle of document files 222 and metadata files 224 are transmitted via the communication interface 240 over the communication network 234 and to the EDS system 250. The bundle of document files 222 and metadata files 224 may contain one or more document files 222, and zero or more metadata files 224 associated with one or more customers (e.g., intended recipients of the documents in the document file(s) 222).

At step 226, the communication interface 255 of the EDS system 250 receives the document file(s) 222 and metadata file(s) 224. The document file(s) 222 and metadata file(s) 224 may be pushed to the EDS system 250 by the company system 202 (e.g., the company system 202 initiates the file transfer without first receiving a request from the EDS system 250), or the EDS system 250 may pull the document file(s) 222 and metadata file(s) 224 from the company system 202 (e.g., the EDS system may request that the company system 202 provide the documents, and/or may initiate the file transfer). As previously described, other methods may be used to transfer the document file(s) 222 and metadata file(s) 224 between the company system 202 and the EDS system 250 (including, for example, transfer via a flash drive or other physical medium).

At step 228, the document file(s) 222 and metadata file(s) 224 are stored in incoming file storage 260 as one or more document files 262 and as one or more metadata files 264, respectively. The storing may be accomplished by the communication interface 255 of the EDS system 250, and/or by a processor of the EDS system 250. At step 238, the incoming document system 270 processes the document file(s) 262 and metadata file(s) 264. Based on the metadata file(s) 264 accompanying the document file(s) 262, the incoming document system 270 determines the recipient, or addressee, of each document file and stores each document file (and, in some embodiments, metadata associated with the document file) in customer document storage 280 for each customer. The process 204 ends at step 238.

Figure 2C:
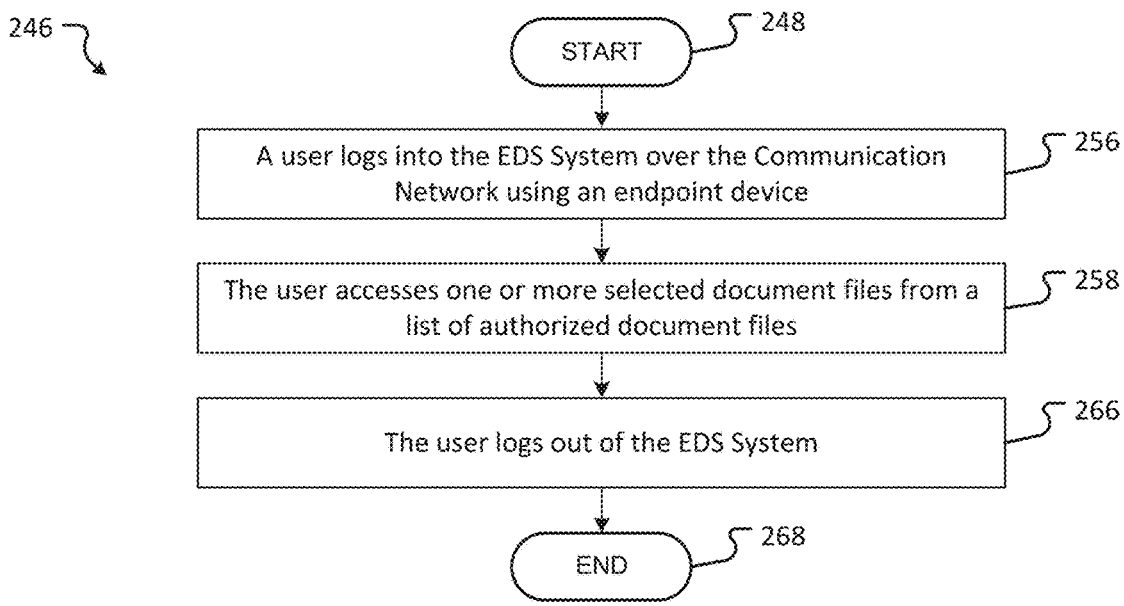
FIG. 2C is a flowchart of another process in accordance with at least one embodiment of the present disclosure.

FIG. 2C is a flowchart illustrating one process 246 that may be performed by a user 240 to access one or more electronic documents from the EDS system 250. A user 240 may only access document files 262 and, in some embodiments, metadata files 264 that the user 240 is authorized to access, e.g., as the identified recipient of the document. In some embodiments, user 240 directly accesses document files 262 and metadata files 264 stored on the EDS system 250 (e.g., by logging into the EDS system 250 or to a remote portal of the EDS system 250 via a communication network 234). Alternatively, the user 240 may utilize a website provided by the company system 202 or by a third-party system to access electronic files stored on the EDS system 250. In order to access any electronic document files corresponding to the user 240 on the EDS system 250, however, the user must first register with the EDS system 250 so as to become a registered user.

Figure 9:
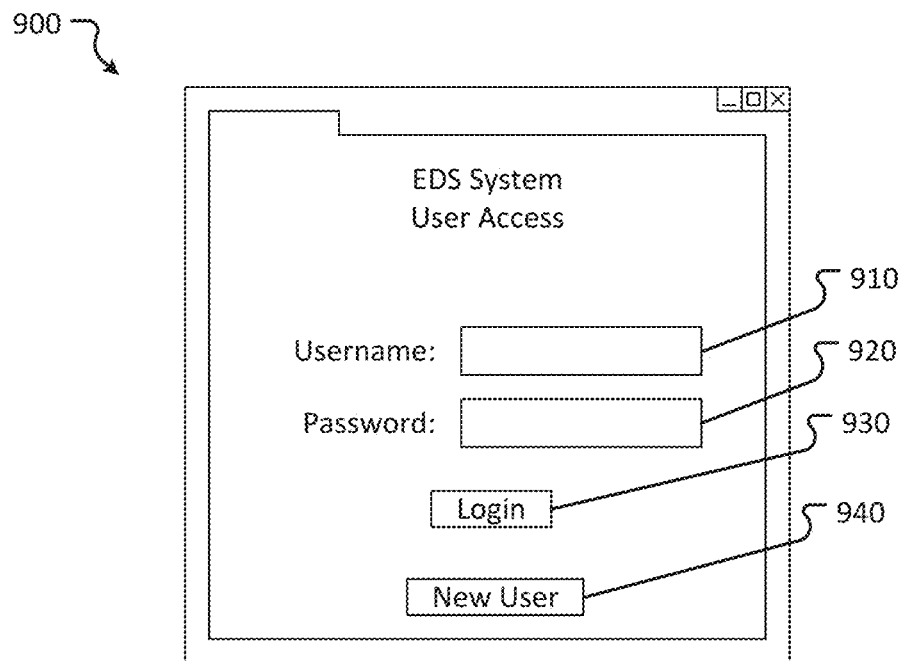
FIG. 9 is an illustration of a user interface in accordance with at least one embodiment of the present disclosure.
Figure 10:
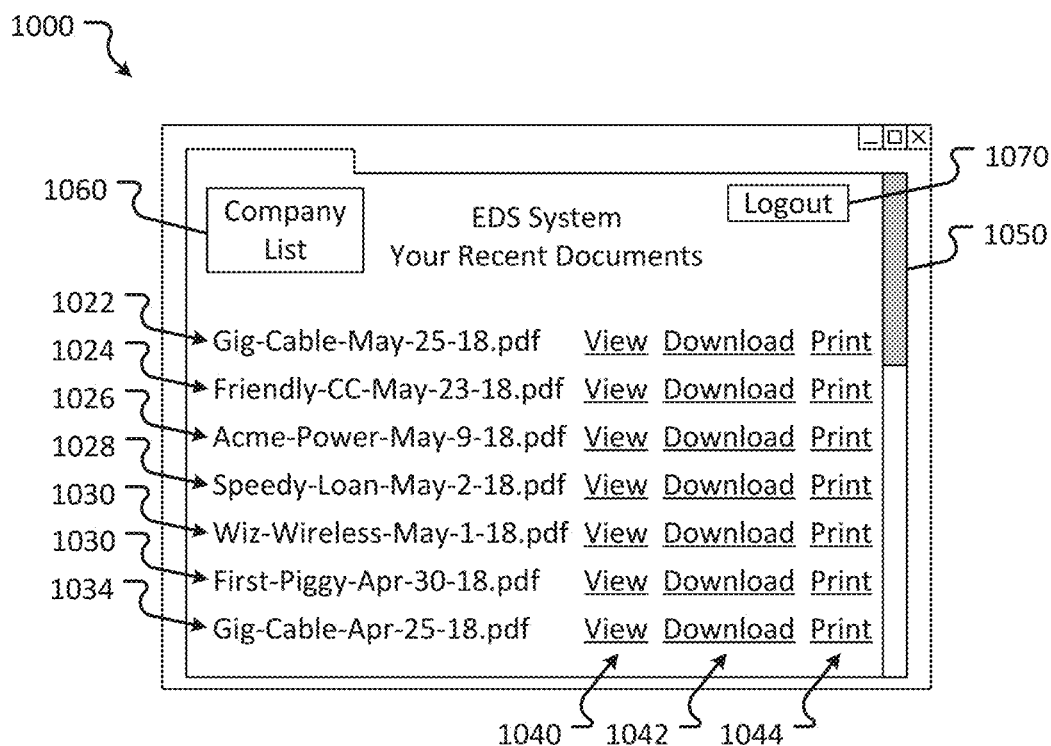
FIG. 10 is an illustration of a user interface in accordance with at least one embodiment of the present disclosure.
Figure 11:
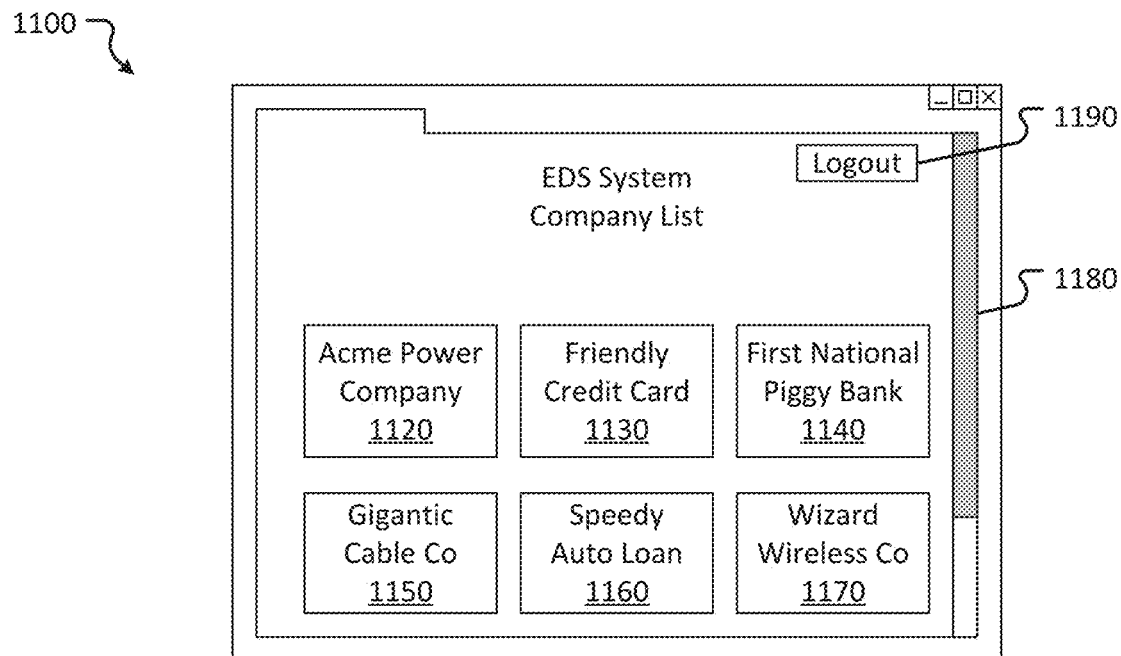
FIG. 11 is an illustration of a user interface in accordance with at least one embodiment of the present disclosure.
Figure 12:
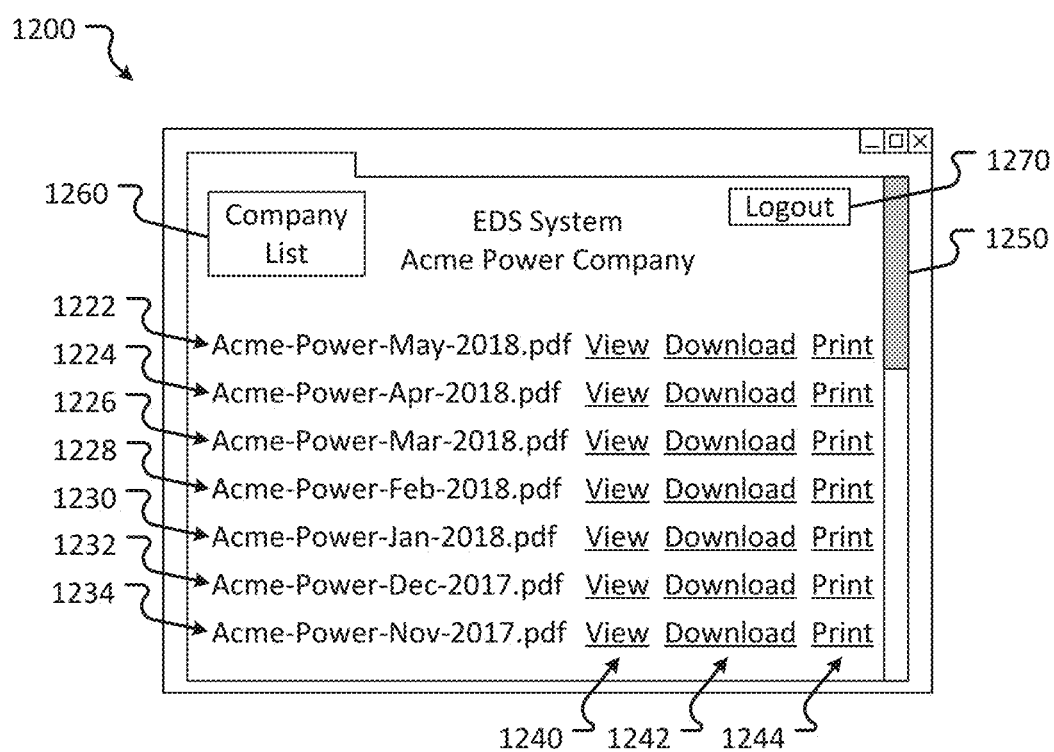
FIG. 12 is an illustration of a user interface in accordance with at least one embodiment of the present disclosure.

The process 246 begins at step 248. At step 256, a user 240 logs into the EDS system 250 over the communication network 234 using an endpoint device by providing login credentials (e.g., using a user interface as shown in FIG. 9). The login credentials may comprise credentials that were generated or otherwise created, for example, when the user 240 registered with the EDS system 250. At step 258, the user 240 accesses one or more selected document files from among available authorized document files (e.g., using a user interface as shown in FIGS. 10-12). At step 266, the user 240 logs out of the EDS system 250. At step 268, process 246 ends.

The user endpoint device, not shown, can be or may include any communication device that can communicate via the communication network 234, such as a Personal Computer (PC), a telephone, video phone, a cellular telephone, a Personal Digital Assistant (PDA), a tablet device, a notebook device, a smartphone, and the like. User 240 may use an application, browser, and/or other software providing a graphical user interface that is executed on the user endpoint device to interact with the EDS system 250 via the communication network 234.

Figure 3A:
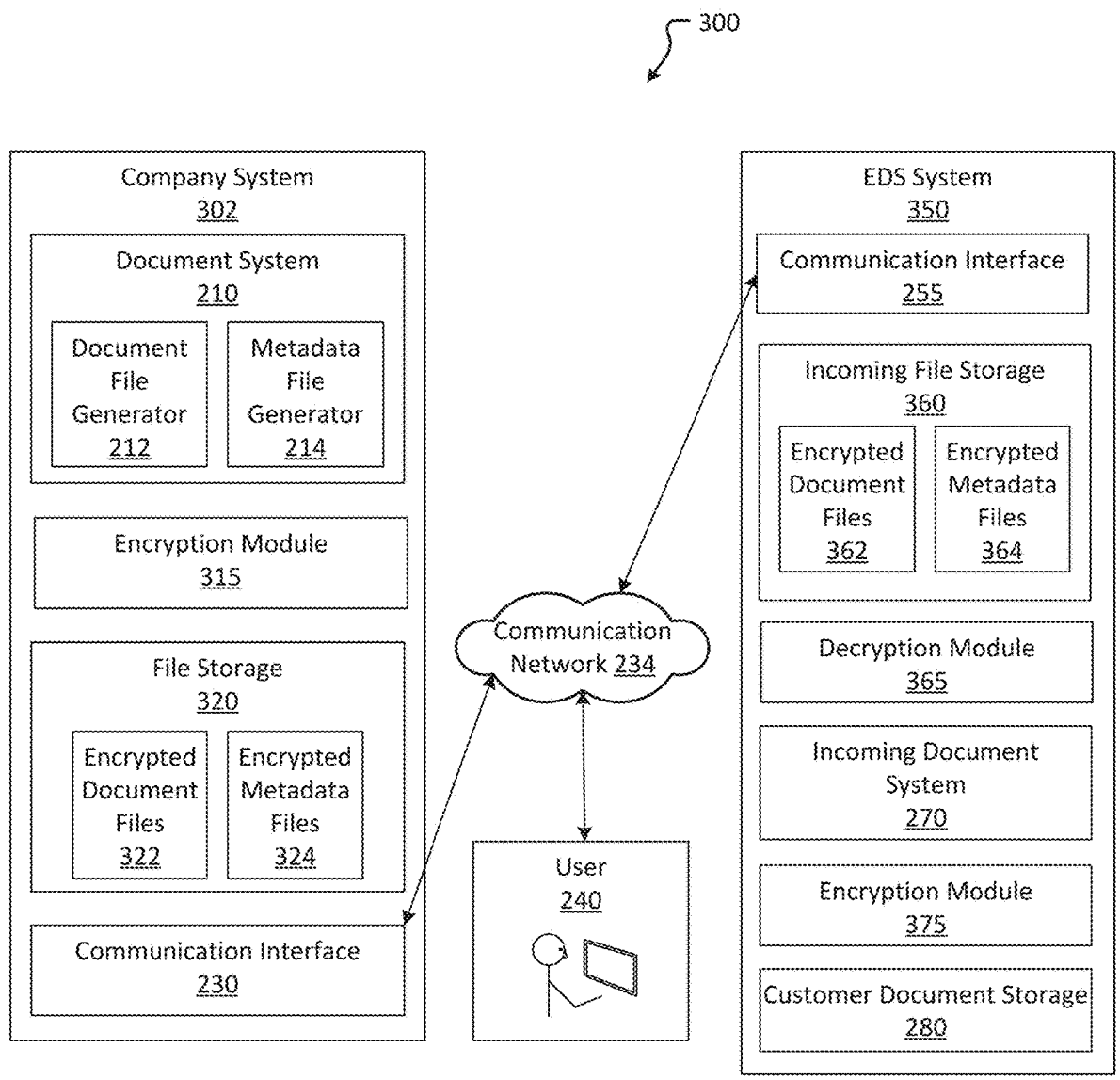
FIG. 3A is a block diagram of systems in accordance with at least one embodiment of the present disclosure.

FIG. 3A is a block diagram of a system 300 according to some embodiments of the present disclosure in which the document files and metadata files are encrypted and decrypted. Thus, the system 300 comprises encryption modules and decryption modules to provide enhanced security, which may be warranted by, for example, the sensitive nature of some of the document files and metadata files (which may comprise customer's private financial, legal, or other information). The core difference between the system 200, as shown in FIG. 2, and the system 300 of FIG. 3 is the addition of the encryption module 315, the encryption module 375, and the decryption module 365. Each of these modules may comprise software and/or hardware configured to utilize one or more known encryption and/or decryption protocols.

Figure 3B:
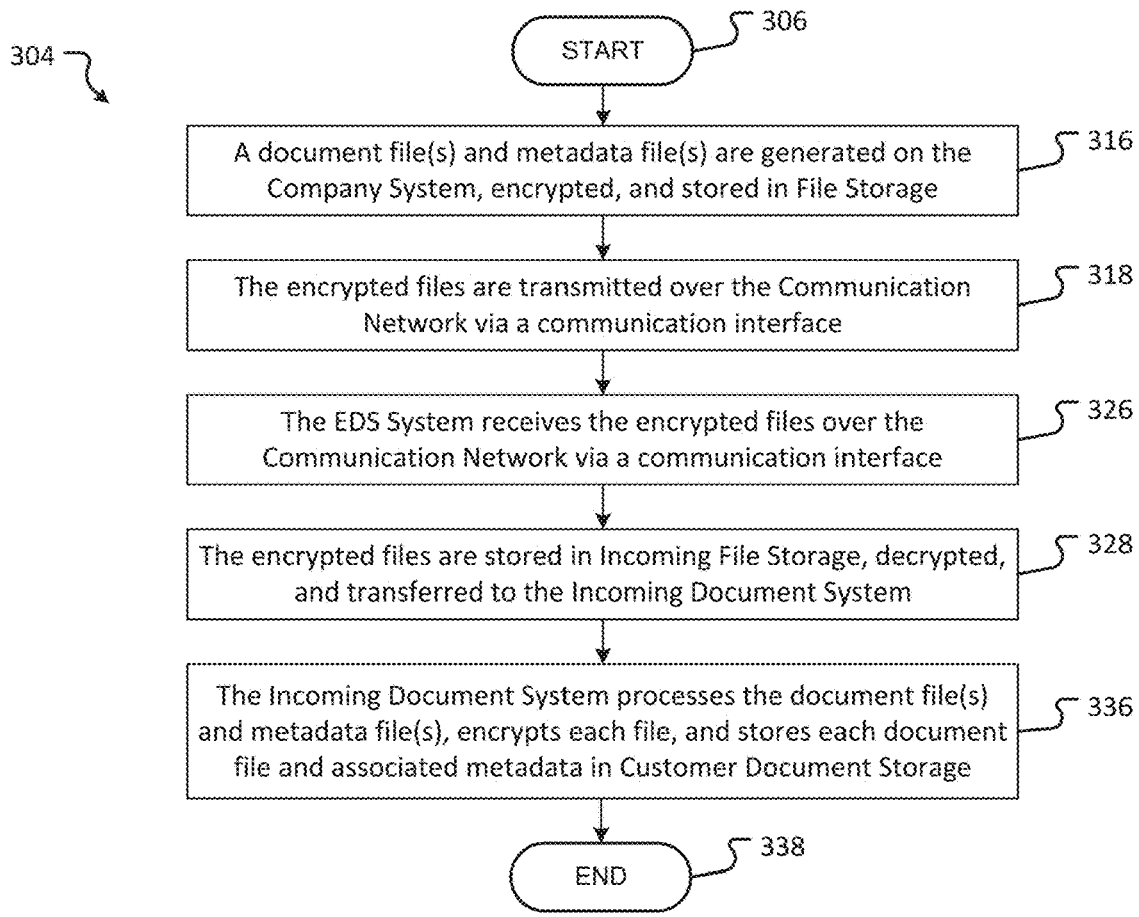
FIG. 3B is a flowchart of a process in accordance with at least one embodiment of the present disclosure.

FIG. 3B is a flowchart illustrating one process 304 that may be performed by a company system 302 and an EDS system 350 to exchange one or more document files and zero or more metadata files.

The process 304 begins at step 306. At step 316, the document system 210 of the company system 202 utilizes a document file generator 212 to generate document files 222 that are encrypted by the encryption module 315 and stored as encrypted document files 322 in the file storage 320. In parallel or in sequence, a metadata file generator 214 of the document system 210 generates metadata files 224 that are encrypted by the encryption module 315 and likewise stores encrypted metadata files 324 in the file storage 320. At step 318, the bundle of encrypted document files 322 and encrypted metadata files 324 are transmitted via the communication interface 230 and the communication network 234 to the communication interface 255 of the EDS system 350. The bundle of encrypted document files 322 and encrypted metadata files 324 may contain electronic documents and metadata for one or more customers.

At step 326, the communication interface 255 of the EDS system 350 receives the encrypted document file(s) 322 and encrypted metadata file(s) 324. The encrypted document file(s) 322 and encrypted metadata file(s) 324 may be pushed to the EDS system 350 by the company system 302 (e.g., the company system 302 initiates the file transfer without first receiving a request from the EDS system 350), or the EDS system 350 may pull the document file(s) 322 and metadata file(s) 324 from the company system 302 (e.g., the EDS system may request that the company system 302 provide the documents, and/or may initiate the file transfer). As previously described, other methods may be used to transfer the encrypted document file(s) 322 and encrypted metadata file(s) 324 between the company system 302 and the EDS system 350 (including, for example, transfer via a flash drive or other physical medium).

At step 328, the encrypted document files 322 and encrypted metadata files 324 are stored in the incoming file storage 360 as encrypted document files 362 and encrypted metadata files 364. The communication interface 255 may cause the files to be stored in the incoming file storage 360, or a processor of the EDS system 350 may cause the files to be stored in the incoming file storage 360.

The decryption module 365 retrieves encrypted document files 362 and encrypted metadata files 364 from the incoming file storage 360, decrypts at least the metadata files 364 (and, in some embodiments, decrypts the document files 362), and transfers the files to the incoming document system 270. At step 336 (based, in some embodiments, on the decrypted metadata files 364 accompanying the encrypted document files 362), the incoming document system 370 determines the recipient, or addressee, of each document file 322. The decrypted files (whether decrypted document files 362, decrypted metadata files 364, or both) are the transferred to the encryption module 375, which re-encrypts and stores the document files 362 and associated metadata in customer document storage 380, where the document files 362 will be stored (at least for a period of time) for on-demand access by each customer. At step 338, process 304 ends.

For an improved level of security, the re-encryption by the encryption module 375 may use a different encryption key and/or encryption algorithm than was used by the encryption module 315 of the company system 302. In some embodiments, only encrypted metadata files 364 are decrypted and processed to determine how to assign each encrypted document file 322 to a corresponding customer. The method used by the company system 302 to exchange encryption keys with the EDS system 350 is not shown, but may include any method known in the art for exchanging encryption keys, including, e.g., elliptic-curve cryptography.

In some embodiments, the encrypted document files 362 (at least as stored in the customer document storage 280) comprise PDF-formatted documents that are password protected. The password protected PDF document may be provided to the user and the user must enter the correct password to view the contents of the document. Alternatively, other document formats that allow password protection may be used.

Figure 3C:
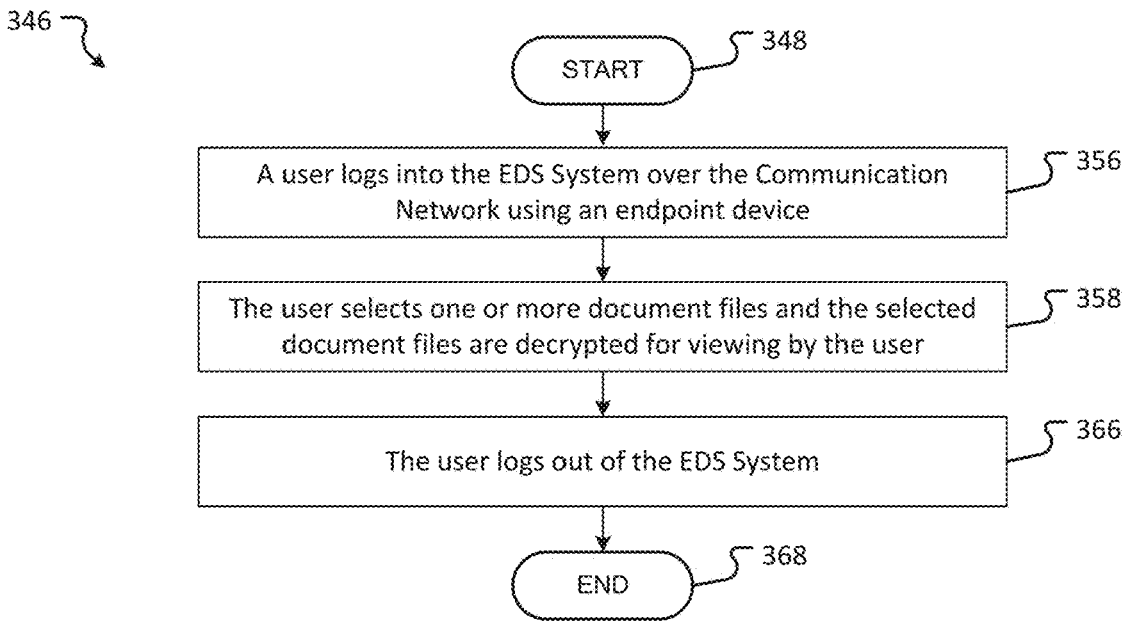
FIG. 3C is a flowchart of another process in accordance with at least one embodiment of the present disclosure.

FIG. 3C is a flowchart illustrating one process 346 that may be performed by a user 240 to access one or more document files. The process 346 begins at step 348. At step 356, a user 240 logs into the EDS system 350 over the communication network 234 using an endpoint device by providing login credentials (e.g., using a user interface as shown in FIG. 9). At step 358, the user 240 accesses one or more selected document files from a list of authorized document files (e.g., using a user interface as shown in FIGS. 10-12) and the selected document files are decrypted for viewing by user 240 (whether by the decryption module 365, or by entry of a password by the user 240, or otherwise). At step 366, the user 240 logs out of the EDS system 350. At step 368, process 346 ends.

When the user 240 selects encrypted document files 362 and/or, in some embodiments, encrypted metadata files 364 to access, the document files 362 and/or metadata files 364 may be sent to the decryption module 365 to be decrypted prior to delivery to the user 240 via the communication network 234. In some embodiments, user 240 directly accesses encrypted document files 362 and encrypted metadata files 364 stored on the EDS system 350 (e.g., without utilizing a third-party web site or portal). Alternatively, user 240 may utilize a web site provided by the company system 302 to access electronic files stored on the EDS system 350. The user 240 may in some embodiments decrypt the files locally (e.g., on the user endpoint device) using the same encryption key and encryption algorithm used by encryption module 375, or by entering a predetermined password known to the user 240. Alternatively, if the files are decrypted by decryption module 365 and re-encrypted by encryption module 375 using an alternate encryption key and alternate encryption algorithm, user 240 may use the alternate encryption key and decryption algorithm to decrypt the files locally.

Figure 4A:
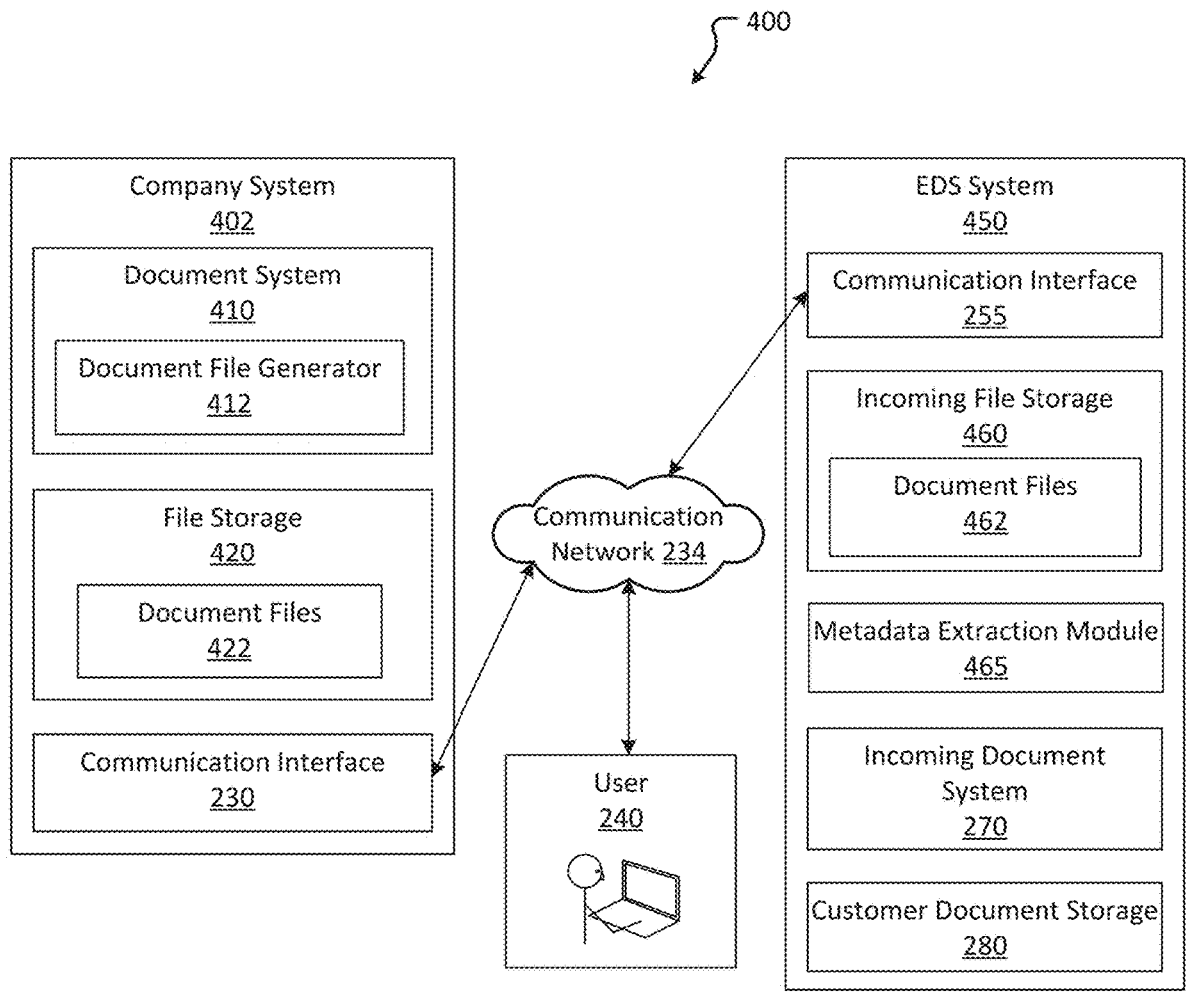
FIG. 4A is a block diagram of systems in accordance with at least one embodiment of the present disclosure.

FIG. 4A is a block diagram of a system 400 comprising a company system 402 and an EDS system 450. In this embodiment, the company system 402 does not comprise a separate metadata file generator. Thus, separate metadata files are not generated and the bundle of electronic documents transferred from the company system 402 to the EDS system 450 of FIG. 4A only contains electronic document files 462 and not one or more separate metadata files.

The EDS system 450 comprises a metadata extraction module 465, which comprises software and/or hardware configured to scan any document files 462 received from the company system 402 in order to determine and retrieve the necessary data for routing documents to the proper customer. The metadata extraction module 465 may extract metadata purposely attached to the document file as metadata, and/or may extract relevant information (e.g., customer name, customer address, customer account number) from within the document itself. Once the information and/or metadata are extracted from the document, the incoming document system 470 has sufficient information to determine which customer(s) has access to each document file 462.

Document system 410 of the company system 402 utilizes a document file generator 412 to generate the document files 422 that are stored in file storage 420. Once all the necessary files are generated, the bundle of document files 422 are sent to the communication interface 230, and transmitted over the communication network 234 to the communication interface 255 of the EDS system 450. The bundle of document files 422 may contain electronic documents and associated information and/or metadata for one or more customers.

Incoming document files 422 are routed (whether by the communication interface 255 or by a processor of the EDS system 350) to incoming file storage 460 for storage as document files 462. The metadata extraction module 465 processes the document files 462 to extract corresponding information and/or metadata, and transfers the files to the incoming document system 470. Based on the extracted information and/or metadata associated with the document files 462, the incoming document system 470 determines the recipient, or addressee, of each document file and stores each document file and corresponding metadata file in customer document storage 480 for each customer.

Figure 4B:
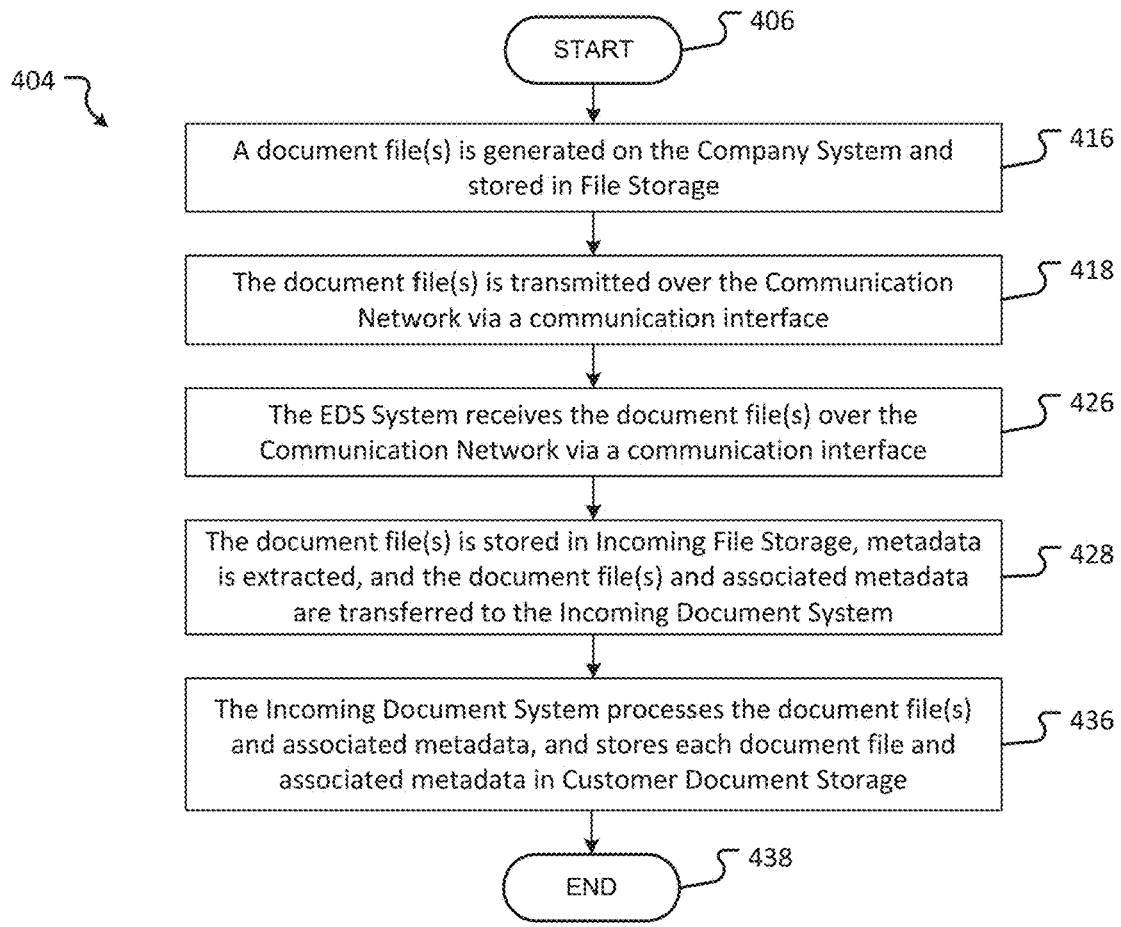
FIG. 4B is a flowchart of a process in accordance with at least one embodiment of the present disclosure.

FIG. 4B is a flowchart illustrating one process 404 that may be performed by a company system 402 and an EDS system 450 to exchange one or more document files, where metadata is extracted from the document file(s) from which the files are made accessible to a user 240.

The process 404 begins at step 406. At step 416, document system 410 of the company system 402 utilizes a document file generator 412 to generate a document file, which document file is stored in file storage 420. This process may be repeated for one or more document files. Once all the necessary files are generated, at step 418, the bundle of document files 422 are sent to the communication interface 230 and transmitted over the communication network 234. The bundle contains one or more document files associated with one or more customers.

At step 426, the communication interface 255 of the EDS system 450 receives the document file(s) 422. The document file(s) 422 may be pushed to the EDS system 450 by the company system 402 (e.g., the company system 402 initiates the file transfer without first receiving a request from the EDS system 450), or the EDS system 450 may pull the document file(s) 422 from the company system 402 (e.g., the EDS system 450 may request that the company system 402 provide the documents, and/or may initiate the file transfer). As previously described, other methods may be used to transfer the document file(s) between the company system 402 and the EDS system 450 (including, for example, transfer via a flash drive or other physical medium).

At step 428, the document file(s) 422 are stored in incoming file storage 460 as one or more document files 462. The document files 422 may be stored in the incoming file storage by the communication interface 255, or by a processor of the EDS system 450. The metadata extraction module 465 processes the document files 462 to extract corresponding information and/or metadata for use in identifying the proper recipient of the electronic document(s) in the document files 422, and transfers the document files 422 to the incoming document system 470. At step 436, based on the extracted information and/or metadata for the document files 462, the incoming document system 470 determines the recipient, or addressee, of each document file and stores each document file and corresponding metadata file in customer document storage 480 for on-demand access by each customer. At step 438, process 404 ends.

Figure 4C:
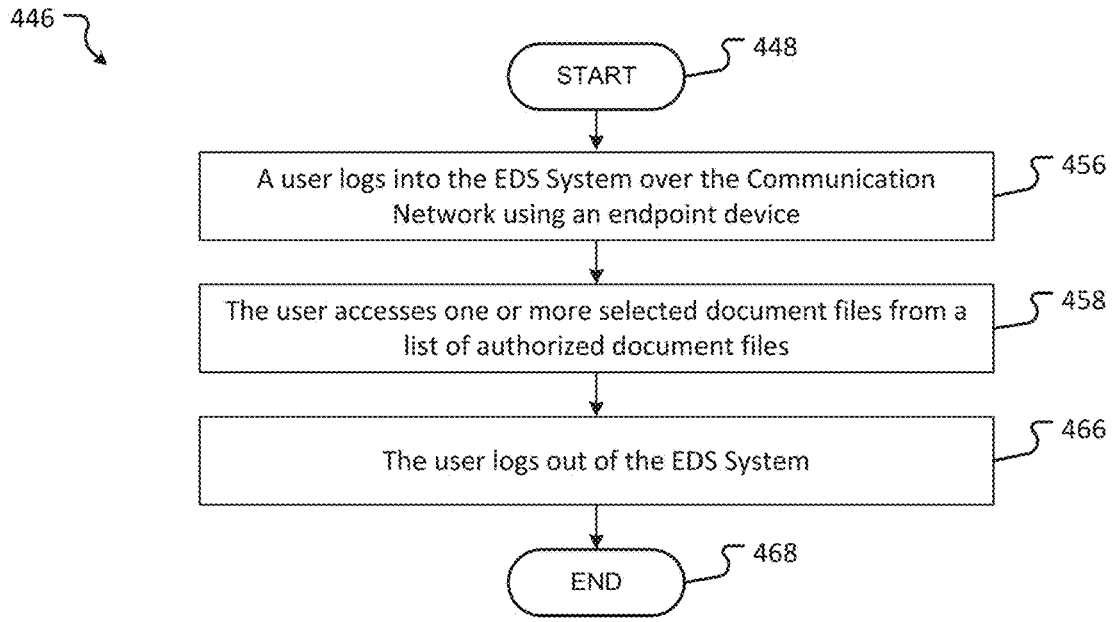
FIG. 4C is a flowchart of another process in accordance with at least one embodiment of the present disclosure.

FIG. 4C is a flowchart illustrating one process 446 that may be performed by a user 240 to access one or more document files, and, in some embodiments, any metadata associated with the document files. User 240 accesses document files 462 that the user 240 is authorized to access, e.g., as the recipient of the document, through the communication network 234. In some embodiments, the user 240 directly accesses document files 462 stored on the EDS system 450. Alternatively, the user 240 may utilize a website provided by the company system 402 to access electronic files stored on the EDS system 450.

The process 446 begins at step 448. At step 456, a user 240 logs into the EDS system 450 over the communication network 234 using an endpoint device by providing login credentials (e.g., using a user interface as shown in FIG. 9). At step 458, the user accesses one or more selected document files from a list of authorized document files (e.g., using a user interface as shown in FIGS. 10-12). At step 466, the user logs out of the EDS system 450. At step 468, process 446 ends.

FIG. 5 is a database table 500 containing field names 510 and field values 520 generated or extracted from document files or from metadata files. Some data may be necessary to clearly identify the recipient customer of the document file, such as the customer name 530, customer address 532, phone number 534, email 536, customer ID 540, and account number 542. Some data may concern the company that produced the document file, such as the company name 538. Some data may be information about the document file, such as the filename 544, document name 546, document date 548, document ID 550, file format 552, and number of pages 554. Also included in database table 500 is the retention time 556 for the document file. In some embodiments, the database table 500 is normalized into multiple database tables. For example, a database table that associates one document ID 550 to one or more customers may allow more than one customer to access a specific document file.

Database table 500 comprises a data set that a company may require according to some embodiments of the present disclosure. Different companies may have or require different sets of data, comprising contents of one or more documents files, metadata associated with the document files, and other sources of information. For example, a utility bill may only have information for the head of household. A bank statement for a child in that household may have the name of the child, and the name of a parent or legal guardian. Insurance documents might have additional information to distinguish between a home policy, auto policy, and/or life policy. Database tables according to embodiments of the present disclosure may include any fields identified in FIG. 5 and/or any other fields that may be useful for accomplishing the purposes of an EDS system as disclosed herein.

Data in this data set can also be used to validate a customer who is creating a new user account on the EDS system 250, 350, and/or 450. The EDS system may request that the user enter a street address, a customer ID number, an account number, a billing address, amount of last bill, and/or other such identifying information that companies have included in each company's metadata file or metadata contained in the document file. If the user correctly enters the information as provided by each company in the metadata file or in the document, the user is authenticated and is then allowed to view those document files stored on the EDS system associated with the user. In other words, the user may then be considered a registered user. In some embodiments, the EDS system may also use third-party sources and methods of validating that the correct person, e.g., recipient of the documents, is given access to the document files. While all registered users of the EDS system may be included on a list of recipients for which the EDS system stores one or more electronic documents, not all recipients on such a list of recipients are registered users (unless every recipient has registered with the EDS system).

Each document may be assigned a retention time by the company, which retention time may be stored in retention time 556 of database table 500. The retention time varies based on the document type, the company's policies, and/or any legal, regulatory, insurance, or other requirements. One of the advantages of the EDS system is to retain documents longer than a company might otherwise retain the documents. For utility bills, a retention time of one year may be sufficient for the utility company, but on the EDS system, these documents may be retained, for example, for two or more years. Some documents used for tax purposes are required by law to be retained for three years after filing, but these documents may be retained, for example, for five or more years on the EDS system. In some embodiments, different types of documents from a single company may be kept for different lengths of time. For example, monthly statements from an investment company may be retained for 3 years, but year-end statements may be retained for 10 years.

A user may have the option of requesting that specific documents have an extended retention time. For example, a user may request that a utility bill used for tax purposes be retained on the EDS system for five years instead of a default length of two years. In some embodiments, a user may revoke permission for the EDS system to retain and process the user's document files.

Prior to deleting documents, the EDS system may notify the user of the imminent end-of-life and give the user the option to extend the retention time and/or obtain copies of the documents before the documents are deleted from the EDS system.

Figure 6:
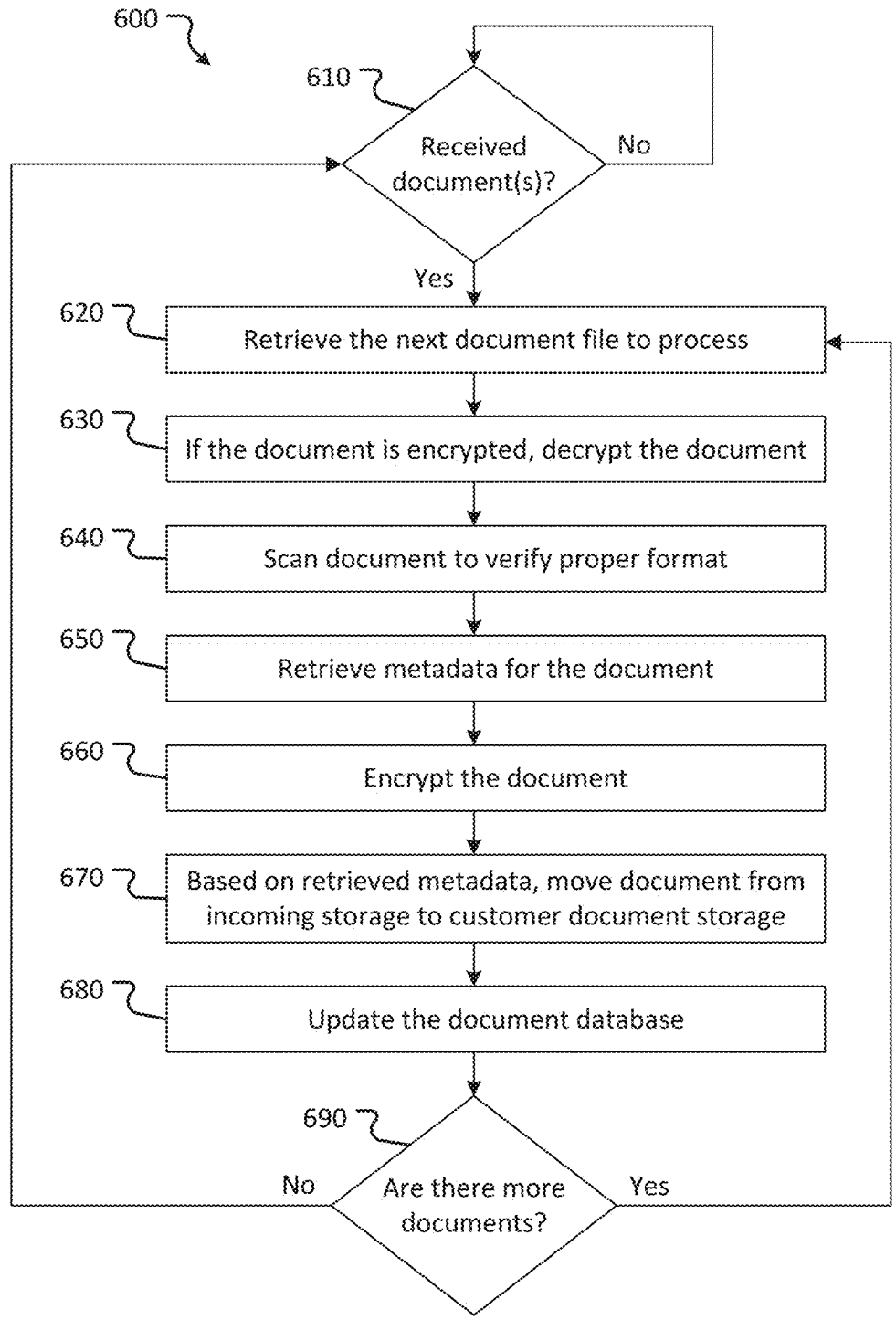
FIG. 6 is a flowchart of a process in accordance with at least one embodiment of the present disclosure.

FIG. 6 is a flowchart illustrating one process 600 that may be performed by an EDS system to process incoming document files as described herein. As previously discussed, when the EDS system receives a new batch of document files and metadata files, the files are processed and stored to allow an authorized user, e.g., as the recipient of the document who is a customer of the company sending the files, to access the documents.

The process 600 begins at test 610. At test 610, the EDS system determines if document files have been received. If test 610 is NO, then the process 600 repeats test 610 until the receipt of documents is detected. If test 610 is YES, the process 600 transitions to step 620, and the EDS system retrieves the next file to process. At step 630, the EDS system decrypts the document file, if the document file is encrypted. At step 640, the EDS system scans the document to verify that the document is in the proper format. During step 640, the EDS system may also scan the document to ensure there is no malware, viruses, spyware, worms, or other malicious software attached or contained in the document. At step 650, the EDS system retrieves the metadata for the document file. The metadata may come from the separate metadata file or be extracted from the document file itself. Once the metadata is obtained, the EDS system has sufficient information to clearly identify which customer, or user of the EDS system, is authorized to access the document file. At step 660, the EDS system re-encrypts the document file, if needed. In some embodiments, encryption is not performed. At step 670, the EDS system, based on the retrieved metadata, moves the document file from incoming storage to the customer's storage location in customer document storage. At step 680, the EDS system updates the database for that customer indicating the presence of a new document. At test 690, the EDS system determines whether there are more documents to process. If test 690 is NO, then the process 600 transitions to test 610 to wait for the receipt of one or more documents. If test 690 is YES, then the process 600 transitions to step 620, and the EDS system retrieves the next document to process and continues to the next step.

Figure 7:
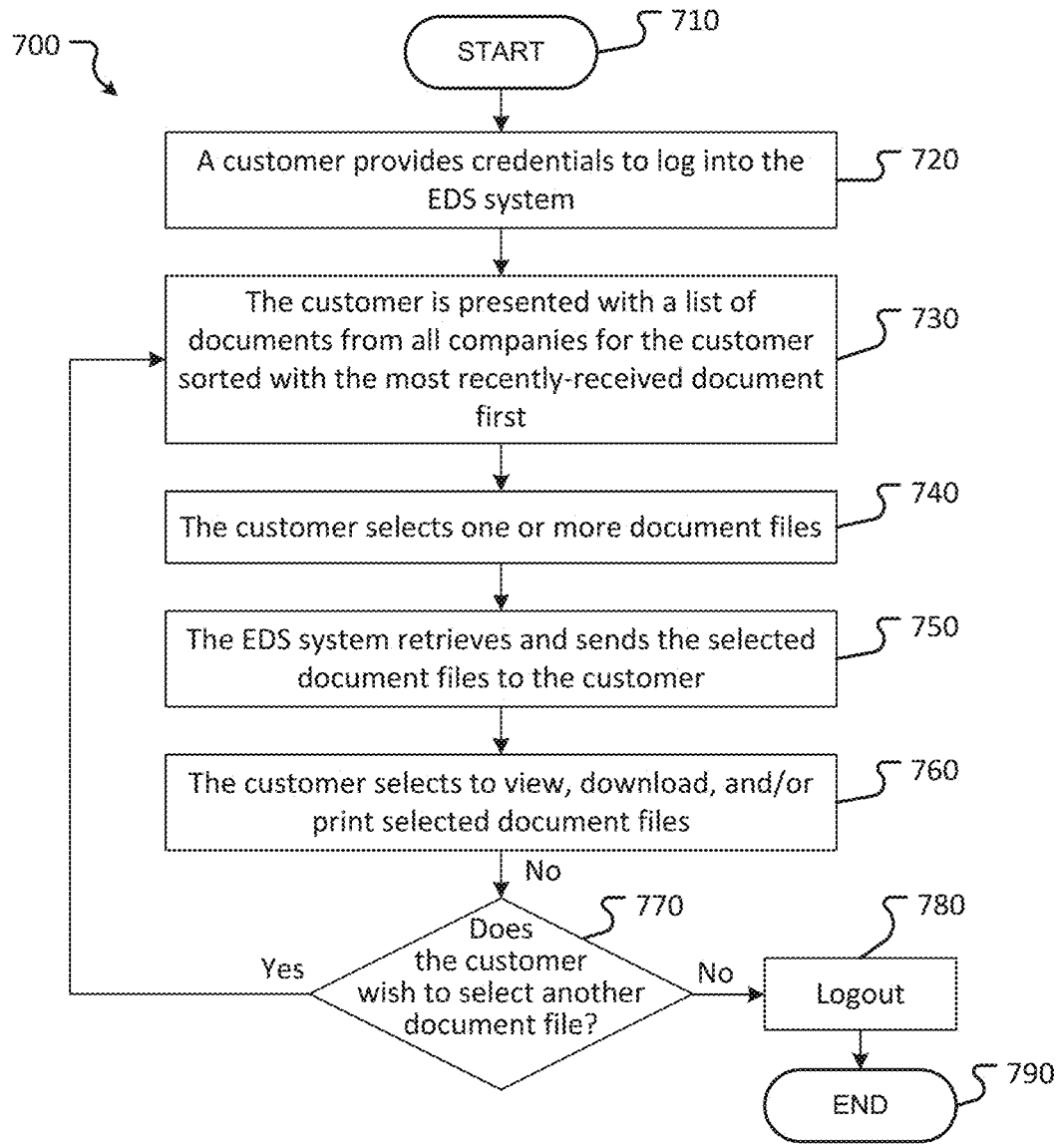
FIG. 7 is flowchart of another process in accordance with at least one embodiment of the present disclosure.

FIG. 7 is flowchart illustrating one process 700 that may be performed for a customer to access one or more document files on an EDS system as described herein. The customer may log into the EDS system using a user endpoint device running an application that communicates over communication network 234 (e.g., a web browser on a computer, an application on a smartphone or tablet, and/or the like), as described in connection with FIGS. 2A-4C. In some embodiments, a customer may log into a company's system, and the company's system may retrieve document files for the customer from the EDS system.

The process 700 begins at step 710. At step 720, the customer enters credentials in a user interface, e.g., as shown in FIG. 9, to log into the EDS system. At step 730, the customer is presented with a list of document files from all the companies that have one or more document files for this user in the EDS system. The documents may be sorted in reverse chronological order with the most recently received document file at the top of the list, as shown in FIG. 10. The first document file may be from one company, the second document file from a different company, and so on. At step 740, the customer selects one of the document files presented at step 730. At step 750, the EDS system retrieves and, if necessary, decrypts the selected document. At step 760, the customer selects to view, download, and/or print the selected document file. At test 770, the EDS system determines if the customer is done accessing the document file. If test 770 is YES, the customer may choose to select another document from the list and the process 700 transitions to step 730. If test 770 is NO, the process 700 transitions to step 770. At step 780, the customer is logged out of the EDS system, for example, by pressing a logout button, and the process 700 transitions to step 790.

Figure 8:
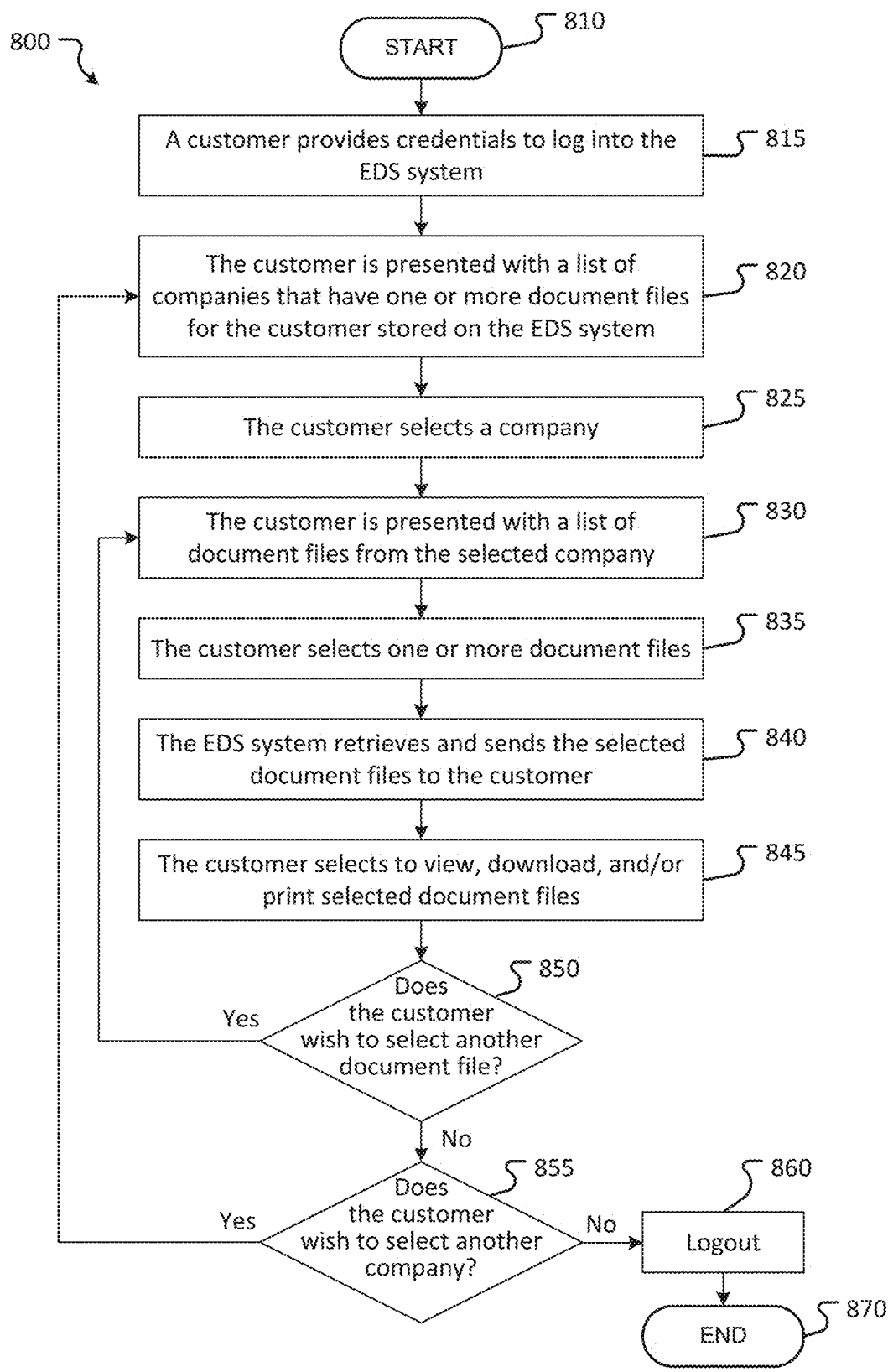
FIG. 8 is flowchart of another process in accordance with at least one embodiment of the present disclosure.

FIG. 8 is a flowchart illustrating another process 800 for a customer to access one or more document files on an EDS system as described herein. The process 800 begins at step 810. At step 815, the customer enters credentials in a user interface, e.g., as shown in FIG. 9, to log into the EDS system. At step 820, the customer is presented with a list of companies that have one or more document files for this specific customer stored on the EDS system. At step 825, the customer selects one of the companies presented at step 820. At step 830, the customer is presented with a list of document files from the selected company. At step 835, the customer selects one of the document files presented at step 830. At step 840, the EDS system retrieves and, if necessary, decrypts the selected document. At step 845, the customer selects to view, download, and/or print the selected document file. At test 850, the EDS system determines if the customer is done accessing the document file. If test 850 is YES, the customer may choose to select another document from that company and the process 800 transitions to step 830. If test 850 is NO, the process 800 transitions to test 860 to determine if the customer wishes to select a different company. If test 860 is YES, the process 800 transitions to step 820 to present the list of companies. If test 860 is NO, the process 800 transitions to step 860. At step 860, the customer is logged out of the EDS system, for example, by pressing a logout button, and the process 800 transitions to step 870.

FIG. 9 is an illustration of an implementation of a user interface 900 configured to allow input of login credentials for an EDS system. A customer of one or more companies is a user of the EDS system. A user gains access by typing in a username 910 and password 920, and pressing the Login button 930. Alternatively, other methods may be used to authenticate a user to securely gain access to files on the EDS system the user is authorized to access as a customer of one or more companies, such as two-factor authentication, multifactor authentication, digital certificates, biometric scans, key cards, social media sign-ins, email authentication, password-less authentication, and other existing and future authentication technology. If the user has not created an EDS system account, the user may press New User button 940 to create a new user account.

FIG. 10 is an illustration of an implementation of a user interface 1000 configured to provide a list of document files from one or more companies associated with a particular customer. In this embodiment, the list is sorted in reverse-chronological order with the most recently received document file listed first, the next recently received document file next, and so on. In this illustration, the most recently received document file 1022 is a bill from Gigantic Cable Co. The next recently-received document file 1024 is a statement from the Friendly Credit Card Company, followed by document file 1026 from Acme Power Company, followed by document file 1028 from Speedy Auto Loan, followed by document file 1028 from Wizard Wireless, followed by document file 1030 from First National Piggy Bank, followed by document file 1034 from Gigantic Cable Co.

The customer chooses to View 1040, Download 1042, and/or Print 1044 an identified document. If the entire list of documents will not fit on the screen or window, the customer may need to use the scroll bar 1050 to view additional documents. Other actions may be made available to the customer, such as selecting multiple documents, filtering and/or sorting the document list, sending a document somewhere via electronic mail, deleting a document, and any other actions that may be desired. In some embodiments, graphical icons could be used in the list, thumbnail views of the document could be shown, and/or any other formatting, graphics, icons, and other layout designs may be used as desired.

In some embodiments, the user may also press the Company List button 1060 to view a list of company that have documents for the user, as shown in FIG. 11. When finished reviewing documents, the user presses the Logout button 1070 of the EDS system to end the session.

FIG. 11 is an illustration of an implementation of a user interface 1100 configured to provide a list of companies associated with a particular customer. User interface 1100 presents a list of all the companies that have documents for that specific customer. In this illustration, the current user is a customer of Acme Power Company 1120, Friendly Credit Card 1130, First National Piggy Bank 1140, Gigantic Cable Co 1150, Speedy Auto Loan 1160, and Wizard Wireless Co 1170. If necessary, the user may need to scroll the scroll bar 1180 down to see additional companies that do not fit on the screen or window. The screen may or may not list companies that do not have this user as a customer. When finished reviewing documents, the user presses the Logout button 1190 of the EDS system to end the session.

Alternatively, a customer could access customer files on the EDS system by first logging into a company's website instead of the EDS system website. The customer may log into the company's website to submit requests, review status, and carry out other tasks related to the goods and services provided by that company. As part of navigating the company's website, the customer could also access past documents. This could be done by the company's website servers retrieving the documents from the EDS system and presenting them to the customer. In this scenario, the EDS system may only permit access to documents that came from the company where the customer is logged into, and not any other documents the EDS system might have for that customer that came from other companies.

Alternatively, a link on the company's website could be displayed which, when clicked, would leave the company's web server(s) and redirect the customer to the EDS system's website pages for further perusal of the customer's documents from that company (and, in some embodiments, from other companies). Other variations are possible to allow customers access to customer documents located on the EDS system.

FIG. 12 is an illustration of an implementation of a user interface configured to provide a list of document files from the selected company associated with a particular customer. The customer selects one or more of the documents, e.g., document 1222, document 1224, document 1226, document 1228, document 1230, document 1232, or document 1234. The customer then chooses to View 1240, Download 1242, and/or Print 1244 the selected document. If the entire list of documents will not fit on the screen or window, the customer may need to use the scroll bar 1250 to view additional documents. Other actions may be made available to the customer, such as selecting multiple documents, filtering and/or sorting the document list, sending a document somewhere via electronic mail, deleting a document, and any other actions that may be desired. In some embodiments, graphical icons could be used in the list, thumbnail views of the document could be shown, and/or any other formatting, graphics, icons, and other layout designs may be used as desired.

When the customer is done with any desired action for the selected document, the customer may select a different document to access, choose to go back to the company list by pressing the Company List button 1260, or log out of the EDS system by pressing the Logout button 1270.

FIG. 13 illustrates one embodiment of an EDS system 1300 upon which the servers, user endpoint devices, computing devices, or other systems or components described herein may be deployed or executed. The EDS system 1300 is shown comprising hardware elements that may be electrically coupled via a bus or network 1304. The hardware elements may include one or more central processing units (CPUs) 1308; one or more input devices 1312 (e.g., a mouse, a keyboard, etc.); and one or more output devices 1316 (e.g., a display device, a printer, etc.). The EDS system 1300 may also include one or more storage devices 1320. By way of example, storage device(s) 1320 may be disk drives, optical storage devices, solid-state storage devices such as a random access memory (RAM) and/or a read-only memory (ROM), which can be programmable, flash-updateable and/or the like.

The EDS system 1300 may additionally include a computer-readable storage media reader 1324; working memory 1330, which may include RAM and ROM devices as described above; a communication interface 1350 (e.g., a modem, a network card (wireless or wired), an infra-red communication device, etc.); a database 1360; (optionally) a Metadata Extraction Module 1370; and (optionally) an Encryption/Decryption Module(s) 1380. The EDS system 1300 may also include a processing acceleration unit 1340, which can include a DSP, a special-purpose processor, and/or the like.

The computer-readable storage media reader 1324 can further be connected to a computer-readable storage medium, which computer-readable storage medium (as well as, in some embodiments, storage device(s) 1320) may represent remote, local, fixed, and/or removable storage devices and storage media for temporarily and/or more permanently containing computer-readable information. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The EDS system 1300 may also comprise software elements, shown as being currently located within a working memory 1330, including an operating system 1332 and/or other code 1334, including code to perform the processes illustrated in FIGS. 2B, 2C, 3B, 3C, 4B, 4C, 6, 7, and/or 8. It should be appreciated that alternate embodiments of an EDS system 1300 may have numerous variations from the embodiments described above. For example, customized hardware might also be used and/or particular elements might be implemented in hardware, software (including portable software, such as applets), or both. Further, connection to other computing devices such as network input/output devices may be employed.

Examples of the processor 1308 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The communication interface 1350 may permit data to be exchanged with the communication network 234, another network, and/or any other computing device described above with respect to the computer environments described herein. Communication interface 1350 may support networking technologies such as Wi-Fi, Bluetooth®, ZigBee, Ethernet, LTE, and/or GSM, and/or may utilize a dedicated Ethernet connection, fiber optics, and/or other wired or wireless network connections. In other embodiments, document files 222 and metadata files 224 may be transmitted via email, through a third-party cloud storage provider, through facsimile machines, and/or other file transmission methods. Alternatively, the files could be transmitted via a physical medium, such as a flash drive, Solid State Drive (SSD), disc drive, magnetic tape, and/or the like. Communication interface 1350 is the same or similar to communication interface 230 and/or communication interface 255.

Database 1360 may be any type of database, including a relational, hierarchical, object-oriented, NoSQL, XML, and/or flat file database. Database 1360 includes database servers such as an SQL Server, SQLite, Oracle Database, Sybase, Informix, MySQL, MongoDB, or other database. Database 1360 may be used to store documents files, metadata files, customer file lists, or other data. Database 1360 may be the same as or similar to file storage 220, 320, and/or 420; incoming file storage 260, 360, and/or 460; and/or customer document storage 280. The database may store, for example, a list of recipients for whom the EDS system has received one or more electronic documents from one or more companies; a list of registered users (e.g., recipients from the list of recipients who have created an account or otherwise registered with the EDS system); a correlation table correlating electronic documents stored by the EDS system with a corresponding recipient (which recipient may or may not be a registered user); and any of the information illustrated or described in connection with FIG. 5 herein.

Metadata extraction module 1370 extracts metadata from one or more document files. As described previously, metadata is information concerning a document file. Metadata associated with a document file may be embedded data in the document file or a separate metadata file containing metadata for one or more document files. Metadata extraction module 1370 may be performed by a dedicated module; software instructions executed on the CPU(s) 1308 and stored in Working Memory 1330; Document Object Model (DOM) processor; and/or other technique. Metadata extraction module 1370 may be the same as or similar to metadata extraction module 465 and/or metadata file generator 214.

Encryption/Decryption module(s) 1380 may comprise a dedicated cryptographic processor, cryptographic hardware routines embedded in CPU(s) 1308; software instructions executed on the CPU(s) 1308 and stored in Working Memory 1330; a dedicated encryption/decryption dongle; and/or other techniques. Encryption schemes implemented by Encryption/Decryption module(s) 1380 include symmetric-key encryption and/or public-key encryption schemes. Encryption and decryption may also be performed by a Virtual Private Network (VPN) connection, Hypertext Transfer Protocol Secure (HTTPS) connection, and/or other secure network connection technique supported by the Communication Interface 1350. Encryption and/or decryption functions may also be performed in conjunction with formatting the document files (e.g., PDF password protection). Encryption/Decryption module(s) 1380 may be the same as or similar to encryption module 315, encryption module 375, and/or decryption module 365.

An electronic document storage (EDS) system according to one embodiment of the present disclosure comprises: a communication interface; a document storage; a database; a processor; and a memory storing instructions for execution by the processor. The instructions, when executed, cause the processor to: receive, from a plurality of sources, a plurality of electronic documents via the communication interface; determine one or more recipients for each of the plurality of electronic documents; based on the determination, store the plurality of electronic documents in the document storage; update the database to link the one or more recipients to each of the plurality of electronic documents; receive, via the communication interface, a request for information corresponding to one or more electronic documents associated with a specific recipient; verify that the request originated with a registered user; and based on the verification, transmit information corresponding to the one or more electronic documents associated with the specific recipient via the communication interface.

Aspects of the foregoing electronic document storage system may include: wherein the information comprises a list of documents linked to the registered user; wherein the database comprises a list of registered users and a list of recipients, and at least one of the recipients is not a registered user; wherein the receiving a plurality of electronic documents comprises receiving one or more electronic documents from a first company and receiving one or more electronic documents from a second company different than the first company; wherein the information comprises information corresponding to at least one of the one or more documents received from the first company and at least one of the one or more documents received from the second company; wherein the plurality of electronic documents are received without being requested; wherein the information corresponding to one or more electronic documents comprises at least one of the plurality of electronic documents; receiving one or more metadata files via the communication interface, the one or more metadata files containing metadata corresponding to the plurality of electronic documents; wherein the determining one or more recipients for each of the plurality of electronic documents comprises determining, based on the metadata, one or more recipients for each of the plurality of electronic documents; extracting recipient information from the plurality of electronic documents; and wherein the determining one or more recipients for each of the plurality of electronic documents comprises determining, based on the extracted recipient information, one or more recipients for each of the plurality of electronic documents.

A method according to another embodiment of the present disclosure comprises: receiving, at a communication interface of an electronic document storage (EDS) system, a plurality of electronic documents, each of the plurality of electronic documents being received from a different source; determining, with a processor of the EDS system and based on metadata corresponding to the plurality of electronic documents, a corresponding recipient for each of the plurality of electronic documents; storing the plurality of electronic documents in a document storage of the EDS system; updating the database to link each of the plurality of electronic documents to the corresponding recipient; generating instructions for displaying, via a graphical user interface, a list of electronic documents associated with one of a plurality of registered users of the EDS system, the list of electronic documents including electronic documents received from a plurality of sources, wherein each registered user is a corresponding recipient but not every corresponding recipient is a registered user; and transmitting the instructions via the communication interface.

Aspects of the foregoing method include: receiving, via the communication interface and from the registered user, a request for the list of electronic documents, wherein the transmitting the instructions occurs in response to the request; wherein the plurality of electronic documents are encrypted upon receipt; wherein the metadata is obtained from a metadata file received via the communication interface; and wherein the database comprises: a list of the corresponding recipients; and a list of registered users.

A device according to embodiments of the present disclosure comprises: a communication interface; a processor; and a memory, the memory storing: a document storage module; a database comprising a list of recipients; and instructions for execution by the processor that, when executed, cause the processor to: receive a plurality of electronic documents from a plurality of sources via the communication interface; store the plurality of electronic documents in the document storage module; correlate each of the plurality of electronic documents to a recipient from the list of recipients, wherein fewer than all of the recipients on the list of recipients are registered users; transmit, via the communication interface, information corresponding to each electronic document correlated to one registered user, wherein at least two of the electronic documents correlated to the registered user were received from different sources.

Aspects of the foregoing device include: wherein the correlating comprises identifying, based on metadata or information extracted from the plurality of electronic documents, a recipient of each of the plurality of electronic documents; wherein the memory stores additional instructions for execution by the processor that, when executed, further cause the processor to: receive, via the communication interface, a request for information corresponding to each electronic document correlated to the registered user; and wherein the plurality of electronic documents are pushed to the communication interface from the plurality of sources.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

Any of the steps, functions, and operations discussed herein can be performed continuously and automatically.

The systems and methods of this disclosure have been described in relation to combining electronic documents from one or more companies and make these documents available online to customers of these companies. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using functional or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. An electronic document storage (EDS) system, comprising:
    a communication interface;
    a document storage;
    a database;
    a processor; and
    a memory storing instructions for execution by the processor that, when executed, cause the processor to:
       receive, from a plurality of sources, a plurality of electronic documents via the communication interface, without first requesting the plurality of electronic documents, wherein the plurality of electronic documents are associated with a plurality of customers of one or more of the plurality of sources, and without requiring that the plurality of customers be registered users with the EDS system when the plurality of electronic documents are received;
       determine a corresponding one or more of the plurality of customers for each of the plurality of electronic documents received;
       based on the determination, store the plurality of electronic documents in the document storage;
       update the database to link each of the plurality of electronic documents to the corresponding one or more of the plurality of customers;
       receive, via the communication interface, a request for information corresponding to one or more electronic documents associated with a specific customer of the plurality of customers;
       determine whether the specific customer is registered with the EDS system; and
       transmit, only when the specific customer is determined to be registered with the EDS system, information corresponding to the one or more electronic documents associated with the specific customer via the communication interface.

2. The EDS system of claim 1, wherein the information comprises a list of documents linked to the specific customer, and wherein transmitting the information comprises causing the list of documents linked to the specific customer to be displayed by a communication device of the specific customer.

3. The EDS system of claim 1, wherein at least one of the plurality of customers is a customer of one of the plurality of sources but not of another of the plurality of sources.

4. The EDS system of claim 1, wherein the plurality of sources includes a first company and a second company different than the first company.

5. The EDS system of claim 4, wherein the information comprises information corresponding to at least one of the one or more documents received from the first company and at least one of the one or more documents received from the second company.

6. The EDS system of claim 1, wherein the information corresponding to one or more electronic documents comprises at least one of the plurality of electronic documents.

7. The EDS system of claim 1, further comprising receiving one or more metadata files via the communication interface, the one or more metadata files containing metadata corresponding to the plurality of electronic documents.

8. The EDS system of claim 7, wherein the determining the corresponding one or more of the plurality of customers for each of the plurality of electronic documents comprises determining, based on the metadata, the corresponding one or more of the plurality of customers for each of the plurality of electronic documents.

9. The EDS system of claim 1, further comprising extracting customer information from the plurality of electronic documents.

10. The EDS system of claim 9, wherein the determining the corresponding one or more of the plurality of customers for each of the plurality of electronic documents is further based on the extracted customer information.

11. A method comprising:
    receiving, at a communication interface of an electronic document storage (EDS) system, a plurality of electronic documents, each of the plurality of electronic documents being received from a different source of a plurality of sources and being associated with one or more of a plurality of customers of one or more of the plurality of sources, without first requesting the plurality of electronic documents, and without requiring that the plurality of customers be users registered with the EDS system when the plurality of electronic documents are received;
    determining, with a processor of the EDS system and based on metadata corresponding to the plurality of electronic documents, a customer correlation, the customer correlation identifying a corresponding one or more of the plurality of customers for each of the plurality of electronic documents received;
    storing, based at least in part on the customer correlation, the plurality of electronic documents in a document storage of the EDS system;
    updating the database to link each of the plurality of electronic documents to the corresponding one or more of the plurality of customers;
    generating instructions for displaying, via a graphical user interface, a list of electronic documents associated with one customer of the plurality of customers only when the one customer of the plurality of customers is determined to be a user registered with the EDS system, the list of electronic documents including electronic documents received from multiple sources, wherein each of the users registered with the EDS system user is a corresponding customer of the plurality of customers but not every corresponding customer of the plurality of customers is registered with the EDS system; and transmitting the instructions via the communication interface.

12. The method of claim 11, further comprising:
receiving, via the communication interface and from the user registered with the EDS system, a request for the list of electronic documents,
wherein the transmitting the instructions occurs in response to the request.

13. The method of claim 11, wherein the plurality of electronic documents are encrypted upon receipt.

14. The method of claim 11, wherein the metadata is obtained from a metadata file received via the communication interface.

15. The method of claim 11, wherein the database comprises:
a list of the plurality of customers; and
a list of the users registered with the EDS system.

16. A device, comprising:
a communication interface;
a processor; and
a memory, the memory storing:
a document storage module;
a database; and
instructions for execution by the processor that, when executed, cause the processor to:
receive a plurality of electronic documents from a plurality of sources via the communication interface, without first requesting the plurality of electronic documents, wherein each of the plurality of electronic documents corresponds to one or more of a plurality of customers of one or more of the plurality of sources, and without requiring that the plurality of customers be registered users when the plurality of electronic documents are received;
correlate each of the plurality of electronic documents to one or more customers from the plurality of customers;

store the plurality of electronic documents in the document storage module based at least in part on the correlation; and transmit, via the communication interface, information corresponding to each electronic document correlated to one registered user, wherein at least two of the electronic documents correlated to the one registered user were received from different sources of the plurality of sources.

17. The device of claim 16, wherein the correlating comprises identifying, based on the metadata or information extracted from the plurality of electronic documents, the one or more customers from the plurality of customers corresponding to each of the plurality of electronic documents.

18. The device of claim 16, wherein the memory stores additional instructions for execution by the processor that, when executed, further cause the processor to:
receive, via the communication interface, a request for information corresponding to each electronic document correlated to the one registered user.

19. The device of claim 16, wherein the plurality of electronic documents is pushed to the communication interface from the plurality of sources.

20. The device of claim 16, wherein the plurality of sources comprises a first company and a second company different than the first company.

21. The EDS system of claim 1, wherein the instructions, when executed, further cause the processor to:
maintain, in the document storage, an aggregated portion of the plurality of electronic documents that are associated with a customer of the plurality of customers, wherein the customer of the plurality of customers is unregistered with the EDS system at a time the plurality of electronic documents are received, wherein the aggregated portion of the plurality of electronic documents are inaccessible by the customer of the plurality of customers while the customer is unregistered with the EDS system, and wherein the aggregated portion of the plurality of electronic documents become accessible by the customer of the plurality of customers when the customer becomes registered with the EDS system.

* * * * *